(12) United States Patent
Christensen et al.

(10) Patent No.: US 11,785,419 B2
(45) Date of Patent: Oct. 10, 2023

(54) DUAL-BAND REAL-TIME LOCATION

(71) Applicant: Actall Corporation, Denver, CO (US)

(72) Inventors: Kevin Christensen, St. Paul, MN (US); Isaac Davenport, Longmont, CO (US); Daniel Yang, Aurora, CO (US); Nicholas McCusker, Denver, CO (US); Fabrizio Polo, Broomfield, CO (US); Robert Hampe, Denver, CO (US)

(73) Assignee: ACTALL CORPORATION, Denver, CO (US)

(*) Notice: Subject to any disclaimer, the term of this patent is extended or adjusted under 35 U.S.C. 154(b) by 258 days.

(21) Appl. No.: 17/158,140

(22) Filed: Jan. 26, 2021

(65) Prior Publication Data
US 2022/0240050 A1 Jul. 28, 2022

(51) Int. Cl.
H04W 4/029 (2018.01)
H04W 4/80 (2018.01)
H04W 4/33 (2018.01)
G01S 11/06 (2006.01)
G01S 1/04 (2006.01)
H04B 17/318 (2015.01)
G01S 5/14 (2006.01)

(52) U.S. Cl.
CPC .......... H04W 4/029 (2018.02); G01S 1/0428 (2019.08); G01S 5/14 (2013.01); G01S 11/06 (2013.01); H04B 17/318 (2015.01); H04W 4/33 (2018.02); H04W 4/80 (2018.02)

(58) Field of Classification Search
CPC ......... H04W 4/028; H04W 4/80; H04W 4/33; H04B 17/318; G01S 1/0428; G01S 5/14; G01S 11/06

USPC ....................................................... 455/456.1
See application file for complete search history.

(56) References Cited

U.S. PATENT DOCUMENTS

| | | | |
|---|---|---|---|
| 6,424,264 | B1 | 7/2002 | Giraldin et al. |
| 6,747,562 | B2 | 6/2004 | Giraldin et al. |
| 7,605,696 | B2 | 10/2009 | Quatro |
| 8,843,155 | B2 | 9/2014 | Burton et al. |
| 9,641,964 | B2 * | 5/2017 | Kulkarni ............. G01S 5/02521 |
| 9,652,955 | B1 | 5/2017 | Ray et al. |
| 10,334,707 | B1 | 6/2019 | Lu et al. |
| 10,440,535 | B2 | 10/2019 | Roberts et al. |
| 10,616,710 | B2 | 4/2020 | Stitt et al. |

(Continued)

Primary Examiner — William Nealon
(74) Attorney, Agent, or Firm — MP Patents, LLC

(57) ABSTRACT

The disclosure describes a real-time location system for tracking assets at a site. The system includes one or more tracking tags for carrying by or on the assets, one or more locating device nodes and a processing application. Each tracking tag includes a short-range radio frequency signal transmitter configured to transmit a beacon signal with unique identification information of the tracking tag. Each locating device node includes a signal receiver configured to receive the beacon signals at a received signal strength and a long-range radio frequency transmitter configured to transmit, using a spread spectrum, long-range modulation over a wide area network, locating signals including the unique identification information of the tracking tag and a received signal strength indicator representing the received signal strength. The processing application is configured to associate tracking tags and locating device nodes based upon the received signal strength indicator.

22 Claims, 16 Drawing Sheets

(56) References Cited

U.S. PATENT DOCUMENTS

| | | | |
|---|---|---|---|
| 2016/0142868 A1* | 5/2016 | Kulkarni | H04W 4/80 |
| | | | 455/456.5 |
| 2018/0084105 A1* | 3/2018 | Hiscock | H04W 4/021 |
| 2019/0069152 A1* | 2/2019 | Bhaumik | H04W 4/80 |
| 2019/0072638 A1* | 3/2019 | Wang | G01S 13/825 |
| 2020/0200851 A1* | 6/2020 | Homsky | G01S 1/14 |

* cited by examiner

DUAL-BAND REAL-TIME LOCATION

BACKGROUND

Real-time location systems are used to track the location of assets such as objects or people as those assets move around near to or within a site such as a building. Wireless tags are carried on or by the assets and wireless signals from the tags are received by one or more reference point receivers near to or within the site and location may be determined by this communication from the wireless tags to the reference points. Communication to the reference points from the wireless tags, backhaul from the reference points through one or more network nodes to one or more analytics tools and associated determination of location of the assets may be complicated by conditions at the site.

SUMMARY

The disclosure describes a real-time location method for tracking assets at a site, including transmitting a beacon signal, receiving the beacon signal at a received signal strength, transmitting a locating signal and receiving the locating signals. A short-range radio frequency signal transmitter of at least one tracking tag for carrying by or on the assets transmits the beacon signal which includes unique identification information of the at least one tracking tag. The beacon signal is received at a received signal strength with one or more signal receivers of one or more wide-angle locating device nodes each including at least one omnidirectional signal receiver and one or more narrow-angle locating device nodes each including at least one directional signal receiver. At least one of a long-range radio frequency transmitter of the one or more wide-angle locating device nodes and a long-range radio frequency transmitter of the one or more narrow-angle locating device nodes transmits, using a spread spectrum, long-range modulation over a wide area network, the locating signal which includes the unique identification information of the at least one tracking tag and a received signal strength indicator representing the received signal strength. A receiver of a gateway in wireless communication with the wide-angle and narrow-angle locating device nodes, receives the locating signals from the locating device nodes over the wide area network. Based upon the received signal strength indicator, the at least one tracking tag is associated to one or more of the wide-angle and narrow angle locating device nodes through the unique identification information of the at least one tracking tag.

The disclosure also describes a real-time location system for tracking assets at a site. The system includes one or more tracking tags for carrying by or on the assets, one or more wide-angle locating device nodes, one or more narrow-angle locating device nodes, a gateway and a processing application. Each tracking tag includes a short-range radio frequency signal transmitter configured to transmit a beacon signal with unique identification information of the tracking tag. Each wide-angle locating device node includes an omnidirectional signal receiver configured to receive, from within a radius of the omnidirectional receiver, the beacon signals at a received signal strength and a long-range radio frequency transmitter configured to transmit, using a spread spectrum, long-range modulation over a wide area network, locating signals including the unique identification information of the tracking tag and a received signal strength indicator representing the received signal strength of the beacon signal. Each narrow-angle locating device node includes a directional signal receiver configured to receive, from a chosen direction, the beacon signals at a received signal strength and a long-range radio frequency transmitter configured to transmit a locating signal including the unique identification information of the tracking tag and a received signal strength indicator representing the received signal strength using the spread spectrum, long-range modulation over the wide area network. The gateway is in wireless communication with the wide-angle and narrow-angle locating device nodes via the wide area network, and includes a receiver configured to receive locating signals from the wide-angle and/or narrow-angle locating device nodes. A processing application is configured to, based upon the received signal strength indicator of the beacon signals, make an association between one or more of the tracking tags and one or more of the wide-angle and narrow-angle locating device nodes through the unique identification information of the tracking tags.

BRIEF DESCRIPTION OF THE FIGURES

The summary above, as well as the following detailed description of illustrative embodiments, is better understood when read in conjunction with the appended drawings. For the purpose of illustrating the disclosure, example constructions are shown in the drawings. However, the disclosure is not limited to specific methods and instrumentalities disclosed herein. Moreover, those having ordinary skill in the art will understand that the drawings are not to scale. Wherever possible, like elements have been indicated by identical numbers.

Embodiments of the disclosure will now be described, by way of example only, with reference to the following diagrams wherein.

DETAILED DESCRIPTION

Figure 1:
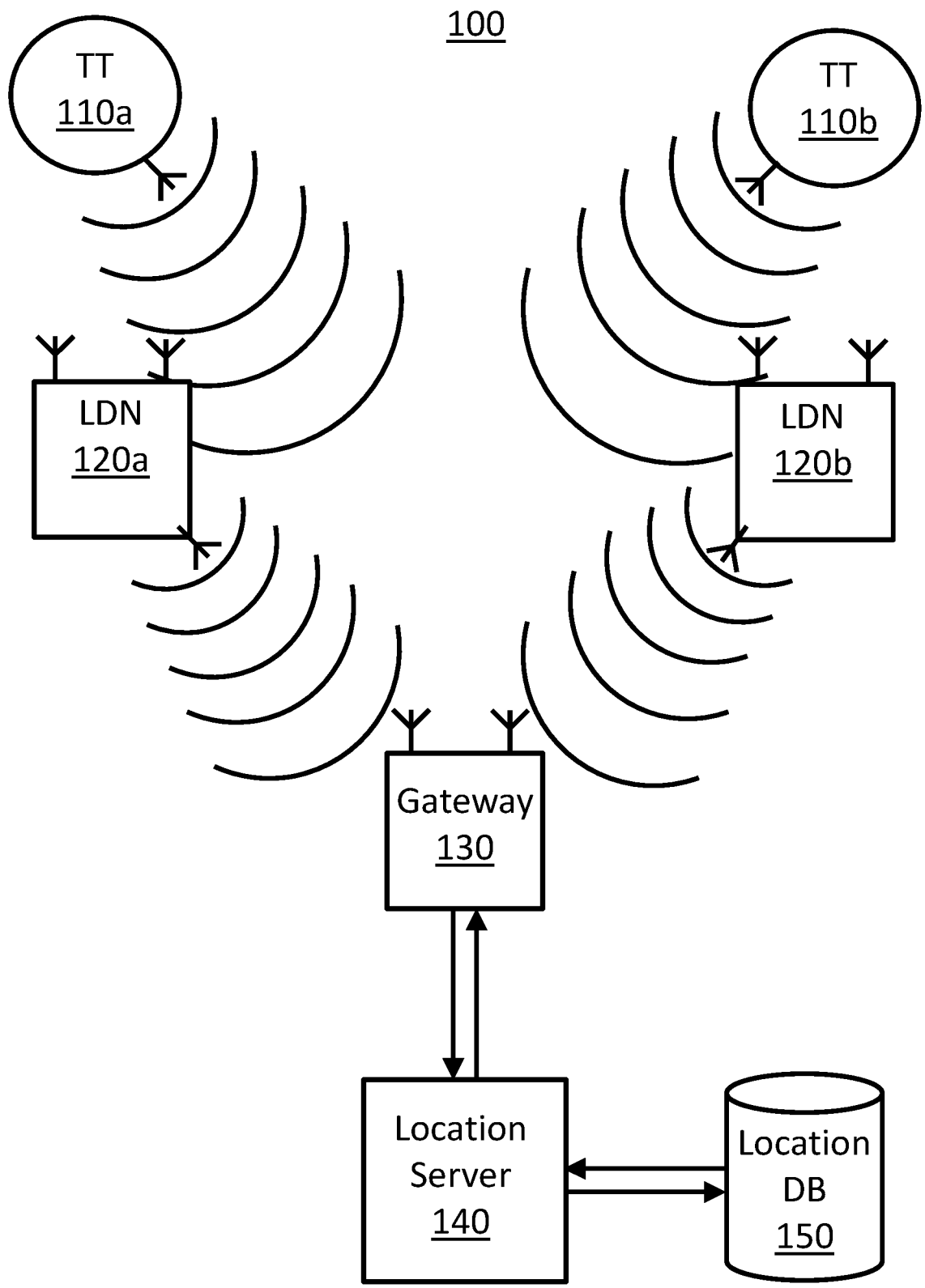
FIG. 1 schematically illustrates an example real-time location system for tracking assets at a site.

The following detailed description illustrates embodiments of the disclosure and manners by which they may be implemented. Although the best mode of carrying out disclosed systems and methods has been described, those of ordinary skill in the art would recognize that other embodiments for carrying out or practicing disclosed systems and methods are also possible. It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Embodiments of the disclosure substantially eliminate, or at least partially address, problems in the prior art, enabling determination of asset location in difficult environments.

Disclosed systems and methods employ beacon signals which are short range radio frequency signals sent by a transmitter tag to a reference point implemented as a locating device node. The received signal strength indication (RSSI) of the beacon signals are used to determine which locating device node, or set of locating device nodes grouped into a zone, the transmitter tag is closest to. The beacon signals and their associated RSSI are bundled together by the locating device node and sent over a long-range wireless network to allow for tracking of the location and alert status of the transmitter tag.

Additional aspects, advantages, features and objects of the disclosure will be made apparent from the drawings and the detailed description of the illustrative embodiments construed in conjunction with the appended claims that follow.

A simplified example use scenario is now described. A resident of a site who is carrying a tracking tag is within a room of the site. The tracking tag periodically transmits a beacon signal which includes unique identification information of the at least one tracking tag which has been associated with identification information of the resident, for example, in a database.

A signal receiver of a wide-angle locating device node within the resident's room receives the beacon signal at a first received signal strength. One or more other signal receivers of locating device nodes in adjacent rooms also receive the beacon signal but at received signal strengths less than the first received signal strength. The reduced signal strength received by the locating device nodes in adjacent rooms is attributed, in part, to reduced penetration of the walls separating the rooms by higher frequency signals of the tracking tag and, in part, to a greater distance from the tracking tag to the locating device nodes in the adjacent rooms.

With radio frequency transmitters, one or more of the locating device nodes in receipt of the beacon signal transmit a locating signal which includes information identifying the tracking tag, a received signal strength indicator (RSSI) representative of one or more signal strengths seen by the locating device nodes and information identifying the one or more locating device nodes. A receiver of a gateway in wireless communication with the locating device nodes, receives the spread spectrum, long-range modulation locating signals from the locating device nodes over the wide area network and forwards the same on to a server in communication with the database. Based upon the received signal strength, the one of the tracking tags is associated to one or more of the locating device nodes through the unique identification information. The resident is determined to be in their room since the RSSI seen by the locating device in the resident's room is larger than RSSI's seen by other locating device nodes.

When, with their tracking tag periodically transmitting the beacon signal, the resident leaves their room through a door to a hallway, a narrow-angle locating device node directed at the doorway receives the beacon signal at a first received signal strength with a signal receiver while the signal receivers of the wide-angle locating device node in the resident's room and other nearby locating device nodes receive the beacon signal at received signal strengths less than that seen by the locating device node directed at the doorway. The resident is determined to be in the doorway of their room since the RSSI seen by the locating device at the resident's doorway is larger than RSSI's seen by the locating device node in the resident's room and other adjacent locating device nodes.

Disclosed methods and systems take advantage of dual frequencies in order to selectively constrain radio signals within rooms of a site. This enables superior resolution with efficient backhaul to locate an asset to within a room and send location information to a distant centralized location for interpretation.

Referring now to the drawings, particularly by their reference numbers, FIG. 1 schematically illustrates an overview of an example real-time location system 100 for tracking assets at a site. It will be appreciated that described features are susceptible to being combined in various ways without departing from the scope of the disclosure as defined by the appended claims. System 100 includes one or more tracking tags 110a, 110b for carrying by or on the assets, one or more wide-angle locating device nodes 120a, one or more narrow-angle locating device nodes 120b, a gateway 130, a location server 140 and a location database 150.

Tracking tags 110a, 110b transmit beacon signals to locating device nodes 120a, 120b. Locating device nodes 120a, 120b are coupled in communication with location server 140 via one or more communication networks which may be a collection of individual networks, interconnected with each other and functioning as a single large network. Such individual networks and components such as gateway 130 may be a combination of wired and wireless. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks and Worldwide Interoperability for Microwave Access (WiMAX) networks.

FIG. 1 is merely an example, which should not unduly limit the scope of the claims herein. It is to be understood that the specific designation for system 100 is provided as an example and is not to be construed as limiting system 100 to specific numbers, types, or arrangements of tracking tags, locating device nodes, servers, databases and communication networks. System 100 may be implemented in various ways, depending on various possible scenarios. In one embodiment, system 100 is arranged in a manner such that functionality for locating assets is implemented partly in location server 140 and partly in locating device nodes 120a, 120b. A person of ordinary skill in the art will recognize many variations, alternatives, and modifications of embodiments of the disclosure.

Figure 2:
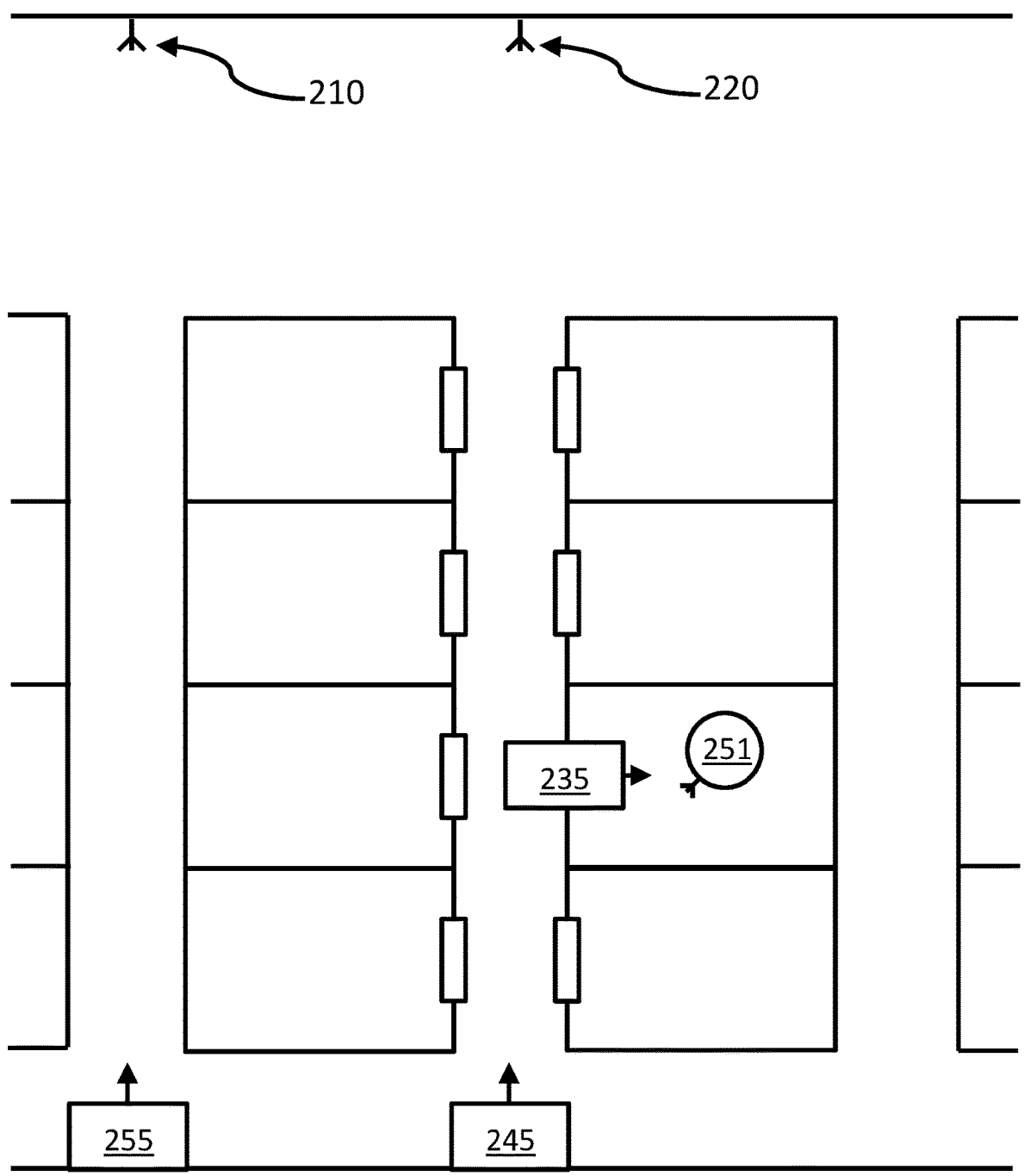
FIG. 2 illustrates an example scenario between a tracking tag and locating device nodes at a site.

FIG. 2 illustrates an example scenario in which an asset carrying a tracking tag 251 is located within a room at a site. In order for tracking tag 251 to physically move from the current room and association with locating device node 235 to a location adjacent to locating device node 210 and an association therewith, tracking tag 251 must physically pass by locating device node 220 and make an intermediate association therewith since RSSI seen at 220 will temporarily be larger than either RSSI seen at locating device node 235 and RSSI seen at locating device node 210. A direct change of association from association with locating device node 235 to locating device node 210 may indicate some external factor, such as constructive or destructive multipath interference, noise, or obstruction caused an extraneous elevation of RSSI seen by locating device node 210. Locating device node 220 may be considered primary to locating device node 235 and locating device node 210 may be considered secondary to locating device node 235. Assets are generally unable to pass directly to a secondary locating device node without first passing to a primary location device node.

While locating device nodes 210 and 220 may be sufficient for locating a tracking tag in the open space surrounding them, in some locations within a site, directional anntennas may give better localized resolution. For example, with the asset carrying the tracking tag 251 located within a room at a site as shown, an omnidirectional anntenna on either side of the door may not clearly disambiguate the asset location as being inside or outside the door. Directional anntennas 235, 245 and 255 may offer improved discrimination as to which side of a door an asset is on. Since directional anntenna 245 will not receive beacon signals from tracking tag 251 when the asset is in the room and directional anntenna 235 will receive beacon signals from, the asset carrying tracking tag 251 is more clearly determined to be inside the room.

In some spaces within a site with a location system installation, it may be necessary to include multiple locating device nodes to adequately cover or sense transmitter tag signals over the entire volume of the space. With multiple locating device nodes in a single space, it may be unnecessary to distinguish tag location between individual locating device nodes. In such cases, more than one locating device node may be grouped into a zone such that a transmitter tag is associated with the zone rather than an individual locating device node and reported location of the tag within the zone will not change so long as the transmitter tag is associable with one or more of the locating device nodes of the zone.

Figure 3:
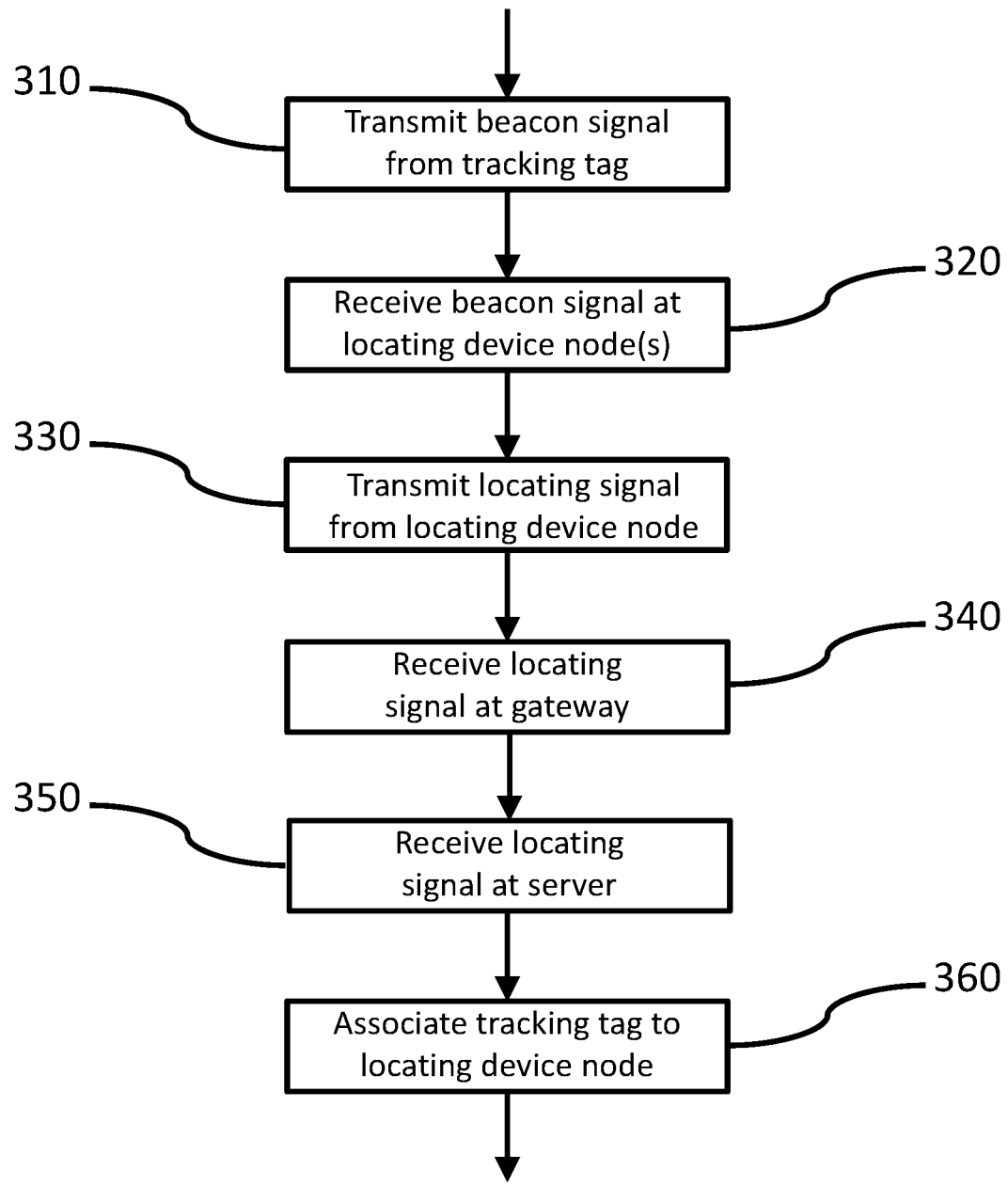
FIG. 3 illustrates a flow of an example real-time location method for tracking assets at a site.

FIG. 3 illustrates actions of a real-time location method for tracking assets at a site, in accordance with an embodiment of the disclosure. The method is depicted as a collection of actions in a logical flow diagram, which represents an example sequence of actions. The method includes transmitting a beacon signal from a tracking tag at 310. A short-range, higher radio frequency signal transmitter of the tracking tag transmits the beacon signal which includes unique identification information of the at least one tracking tag. The beacon signal is received at a received signal strength at one or more locating device nodes at 320. The beacon signal is received with one or more signal receivers of one or more wide-angle locating device nodes each including an omnidirectional signal receiver and one or more narrow-angle locating device nodes each including a directional signal receiver.

A locating signal is transmitted from one or more locating device nodes at 330. At least one long-range radio frequency transmitter of the one or more of the wide-angle locating device nodes and the narrow-angle locating device nodes transmits locating signals at a lower frequency, using a spread spectrum, long-range modulation over a wide area network. The locating signal includes the unique identification information of the tracking tag, a received signal strength indicator representing the received signal strength and unique identification information of the one or more locating device nodes.

At 340, the locating signals are received from the locating device nodes over the wide area network at a gateway in wireless communication with the locating device nodes. The locating signals are then received at a server at 350 and, based upon the received signal strength, the tracking tag is associated with one or more locating device nodes through the unique identification information of the tracking tag and unique identification information of the one or more locating device nodes at 360.

This method, described with reference to FIG. 3, emphasizes intelligence at the server over intelligence at the edge such as with the locating device nodes. The actions 310 to 360 are only illustrative and other alternatives can also be provided where one or more actions are added, one or more actions are removed, or one or more actions are provided in a different sequence without departing from the scope of the claims herein.

FIG. 3 illustrates a flow of another example real-time location method for tracking assets at a site where intelligence is distributed to the locating device nodes instead of or in addition to the location server. This method includes transmitting a beacon signal from a tracking tag at 310, receiving the beacon signal at a received signal strength at one or more locating device nodes at 320, associating the assets with a location at 330 based upon the received signal strength, and transmitting a locating signal from one or more locating device nodes at 340. Associations may then be forwarded on through the system and received through one or more other locating device nodes, gateways such as 130 and/or servers such as 140.

Regardless of the distribution of intelligence within the system, the method may further include changing from a first association between the at least one tracking tag and a first of the locating device nodes to a next association between the at least one tracking tag and a second of the locating device nodes when a received signal strength indicator of the beacon signal of the at least one tracking tag at the second of the locating device nodes is larger than a received signal strength indicator of the beacon signal of the at least one tracking tag at the first of the locating device nodes. More generally, changing associations between tracking tags and locating device nodes may take place when received signal strength indicators of the beacon signals or combinations thereof as observed at a first set of locating device nodes are differentiated from received signal strength indicators or combinations thereof as observed a second set of locating device nodes by some other comparison. Such comparison may involve mathematical techniques, filtering and/or influence of historical data of the tag, locating device nodes or system.

Again considering the resident carrying the tracking tag within a room of the site, if an RSSI seen by a radio frequency receiver of a locating device node in a room adjacent to a resident's room is higher than an RSSI seen by the radio frequency receiver of the locating device node in the resident's room, but the resident had not been intermediately determined to be in the doorway, the resident's location will not be updated to the adjacent room since moving to the adjacent room requires passing through the resident's doorway.

Figure 4:
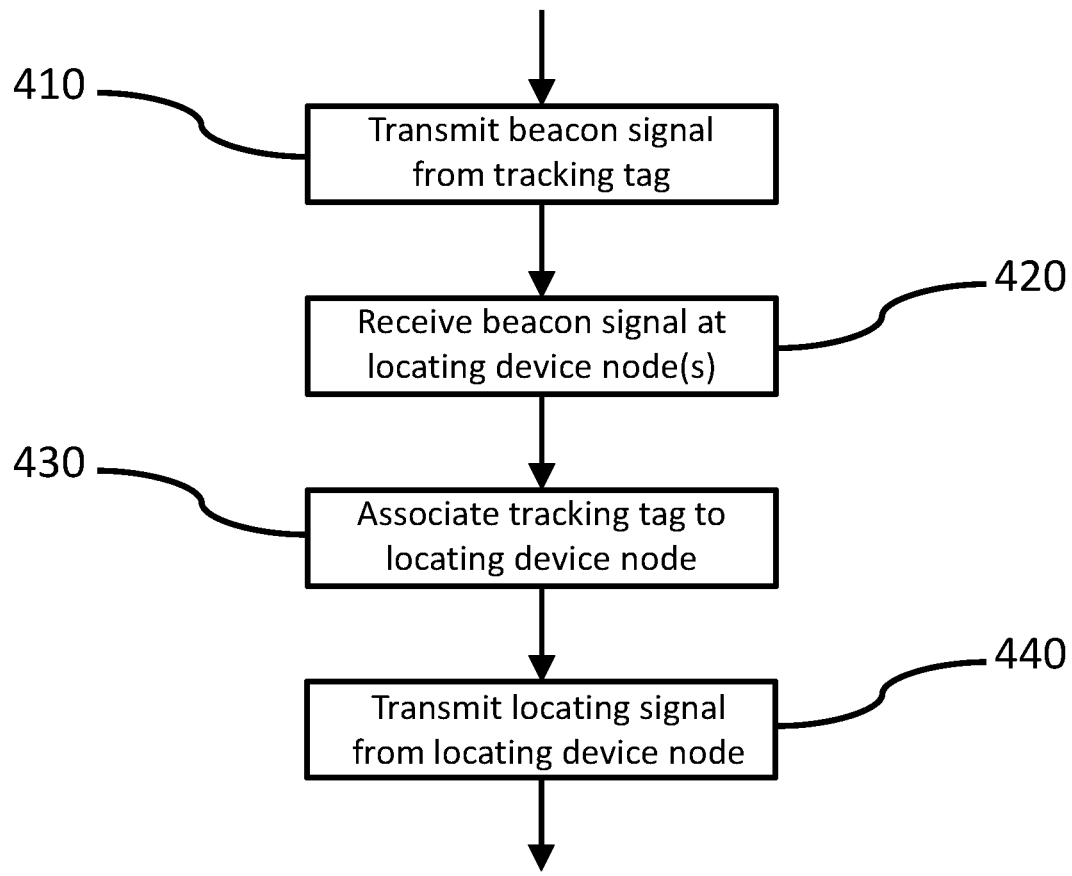
FIG. 4 illustrates a flow of another example real-time location method for tracking assets at a site.
Figure 5:
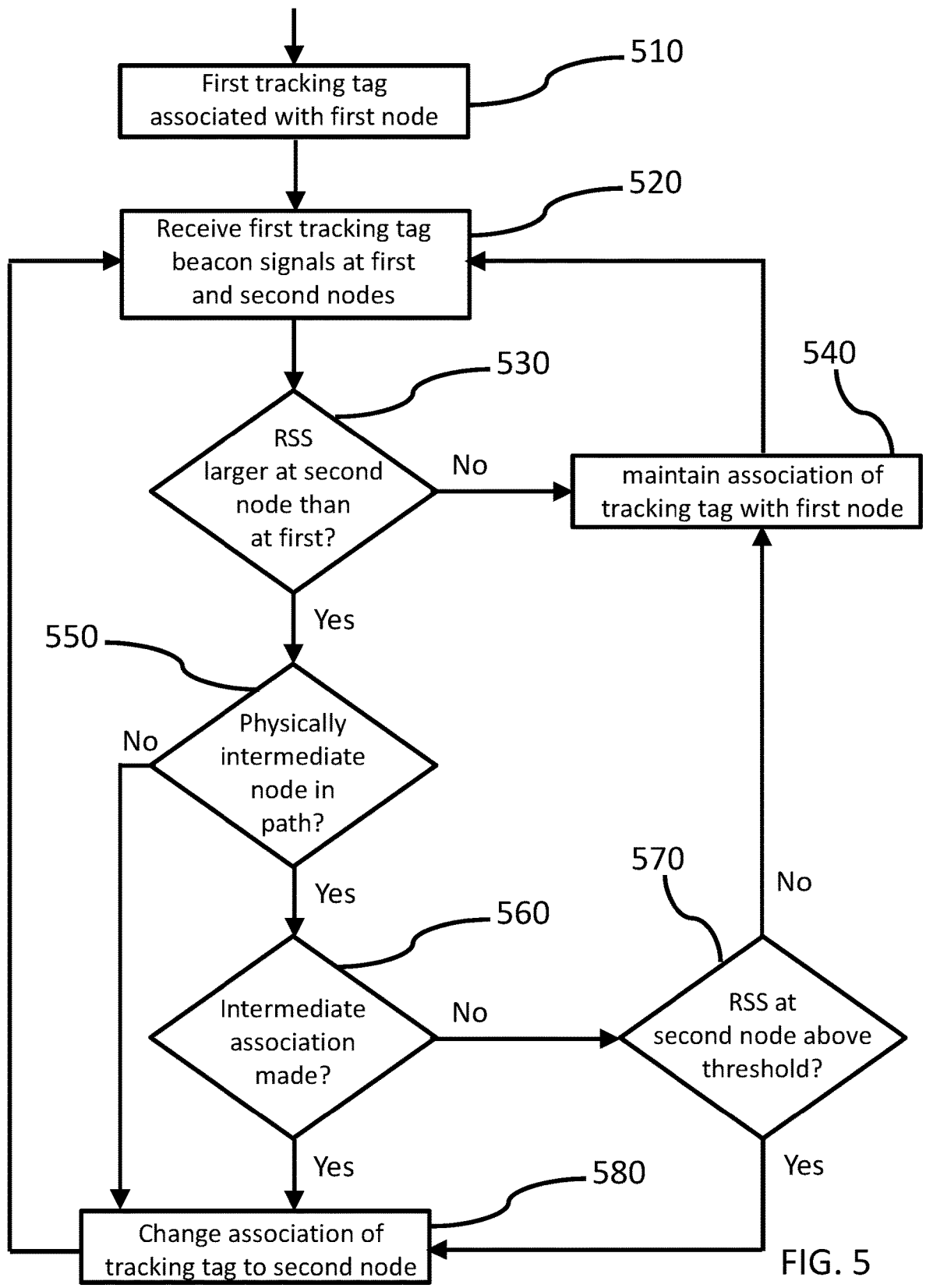
FIG. 5 illustrates a flow of an example process for evaluating relative received signal strength indicators suitable for use with disclosed methods.

FIG. 4 illustrates a location ignores sub-method, a process for evaluating relative received signal strength indicators suitable for use with disclosed methods. The sub-method mitigates against the tracked location of a tracking tag jumping from the actual location of the tracking tag to a second location not possible without passing an intermediate location first. For example, it would not be possible for a tracking tag to jump from a locating device node located on a second floor to a locating device node on a third floor without first passing a locating device node located a stairwell or elevator.

With first tracking tag already associated with a first node at 410. Subsequent beacon signals are received by first and second locating device nodes at 420. If the RSSI at the second node is not larger than the RSSI at the first node at 430, the association between the first tracking tag and the first locating device node is maintained at 440. If the RSSI at the second node is larger than at the first node, at 450, it is determined whether there is an intermediate node physically intermediate the first and second locating device nodes along a path therebetween. If there is no physically intermediate locating device node, the association with the first tracking tag is changed to the second node at 480.

If there is a physically intermediate locating device node, it is determined whether an intermediate association has been made at 460. If an intermediate association is made, the association with the first tracking tag is changed to the second node at 480. If no intermediate association is made, the higher RSSI observed at the second locating device node may be ignored so that the association between the first tracking tag and the first locating device node is maintained at 440. Location at the second locating device node is thus effectively ignored. However, the ignored location can be defeated or overridden when it is determined that RSSI at the second node is above a threshold at 470. Then, the association with the first tracking tag is changed to the second node at 480. However, if the RSSI is not above the threshold, the RSSI observed at the second locating device node may nevertheless be ignored and the association between the first tracking tag and the first locating device node maintained at 440.

The actions 410 to 480 are only illustrative and other alternatives can also be provided where one or more actions are added, one or more actions are removed, or one or more actions are provided in a different sequence without departing from the scope of the claims herein.

Figure 6:
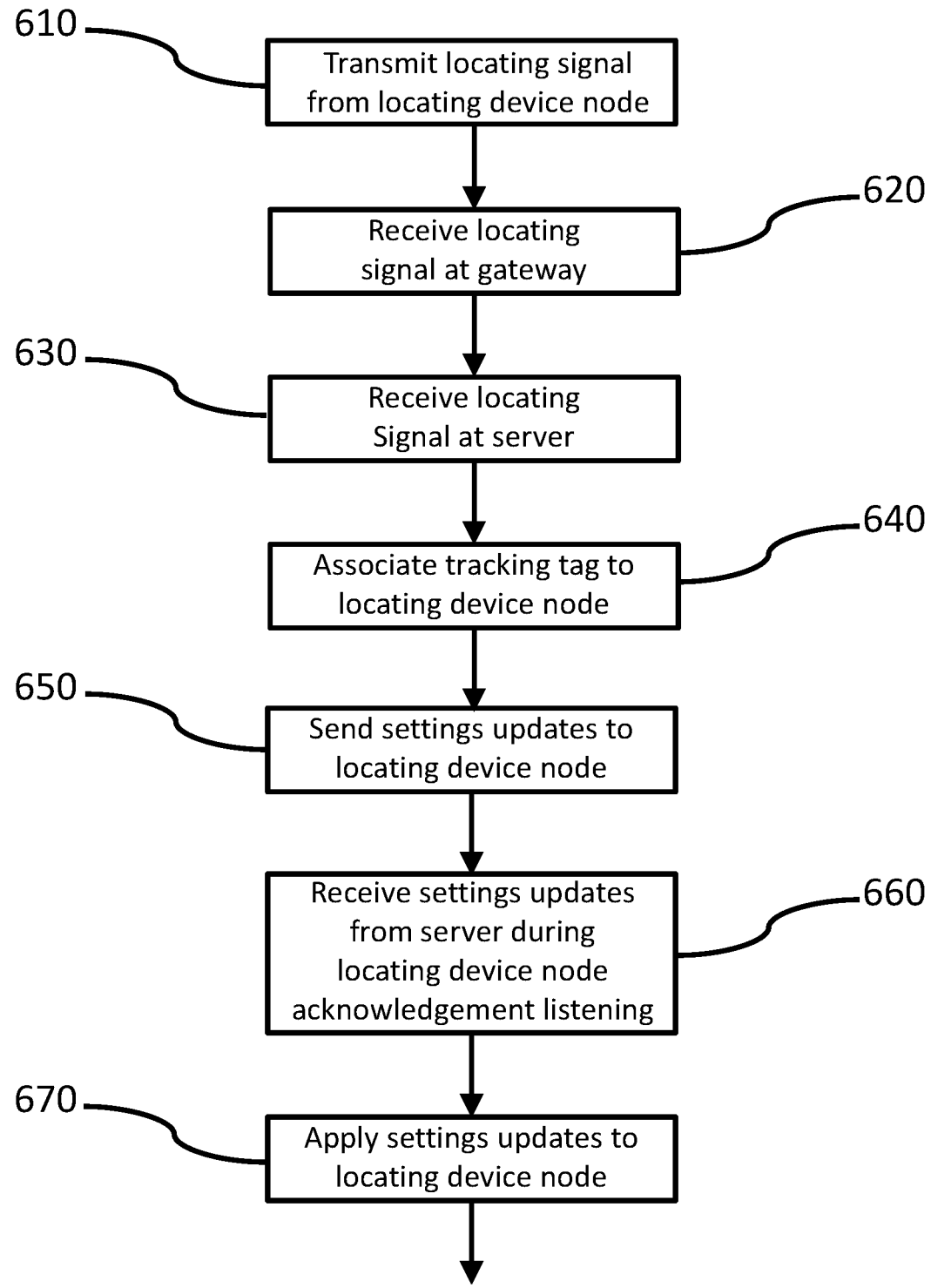
FIG. 6 illustrates a flow of an example process for updating settings suitable for use with disclosed methods.

Sometimes settings, such as adaptive data rate and locating device node short address or network name and password need to be changed and/or updated. Particularly with high-security sites, making in-person settings changes can be time-consuming and/or unsafe. The real-time location method may further include updating settings of one or more of the locating device nodes, over-the-air, from the server, through the gateway. FIG. 6 illustrates an example method in which a locating signal is transmitted from a locating device node at 610 and received at a gateway at 620. The gateway forwards the locating signal which is received by the server at 630. At 640, the tracking tag is associated to/with a locating device node as during normal operation. During gateway and/or server acknowledgement receipt of the locating signal, settings updates are sent to the locating device node at 650. At 660, settings updates are received from the gateway. For example, settings updates are received with a long-range radio frequency receiver of one or more of the locating device nodes over the lower power wide area network. Settings updates are applied to the locating device node or nodes at 670, for example, by a processing application and or processor of the locating device nodes. Settings updates may be passed to one or more other locating device nodes over the lower power wide area network.

The actions 610 to 670 are only illustrative and other alternatives can also be provided where one or more actions are added, one or more actions are removed, or one or more actions are provided in a different sequence without departing from the scope of the claims herein.

In some embodiments, settings of locating device nodes may be made with a physical means for configuring settings. For example, sensitivity of one or more of the receivers of the locating device nodes may be adjusted with a dial, knob, slider, lever, button or a combination of these.

Figure 7:
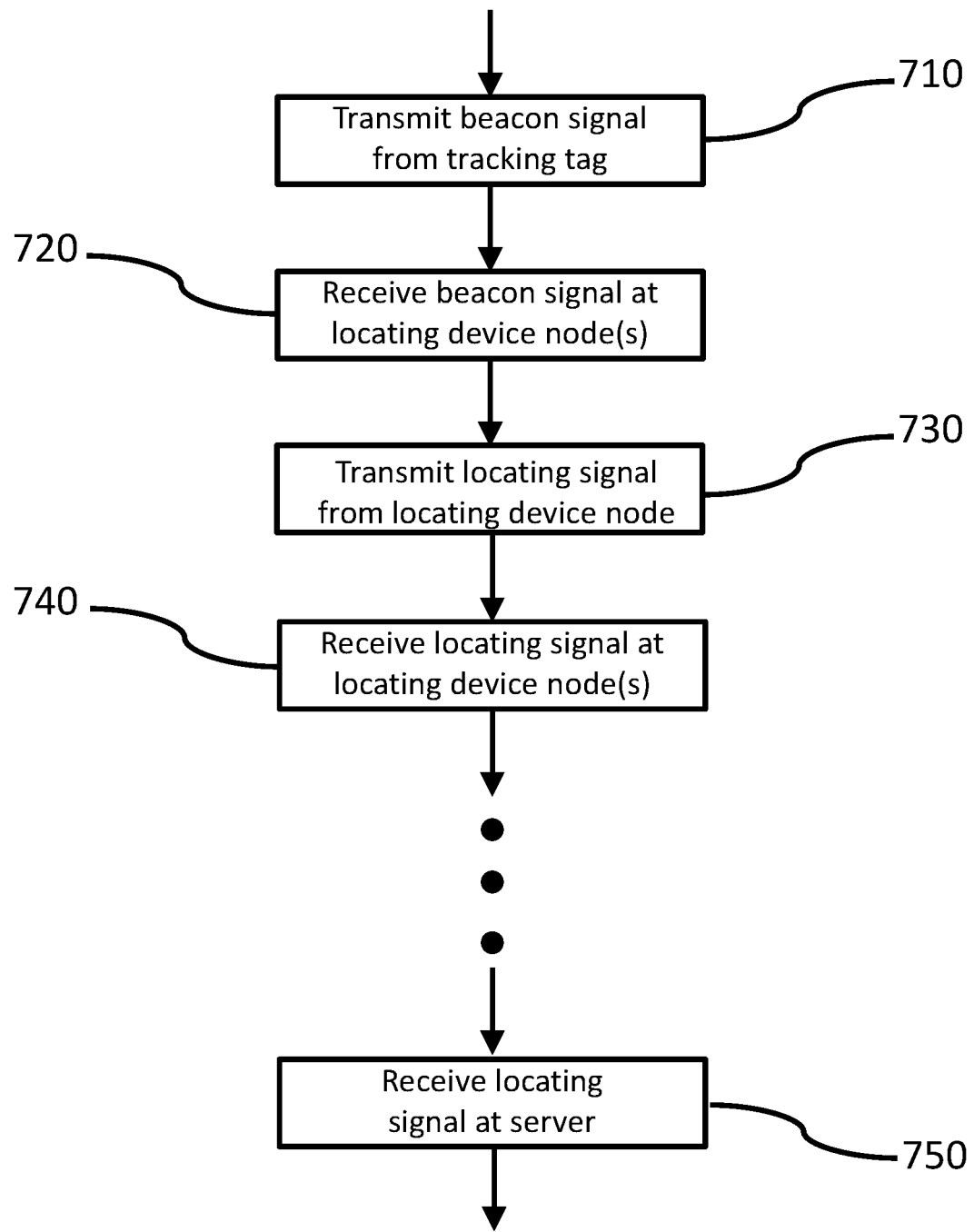
FIG. 7 illustrates a flow of an example process for peer-to-peer transmissions between locating device nodes suitable for use with disclosed methods.

FIG. 7 illustrates a flow of an example process for peer-to-peer transmissions between locating device nodes which is suitable for use with disclosed methods. Process flow is similar to that described with reference to FIG. 2 in which a long-range radio frequency receiver of one or more of the wide-angle locating device nodes and narrow-angle locating device nodes receives locating signals from one or more other wide-angle locating device nodes and narrow-angle locating device nodes over the wide area network. At 710, a beacon signal is transmitted from a tracking tag and received by one or more locating device nodes at 720. With the unique identification information and RSSI of the beacon signal repackaged into a locating signal, the locating signal is transmitted from the locating device node at 730 and received by another locating device node at 740. The locating signal and/or information therein may be subsequently transmitted to other nearby locating device nodes to allow local decisions to be made about which locating device or zone of locating device nodes is associated with a tag before the information is ultimately received by the server at 750.

The actions 710 to 750 are only illustrative and other alternatives can also be provided where one or more actions are added, one or more actions are removed, or one or more actions are provided in a different sequence without departing from the scope of the claims herein.

Figure 8:
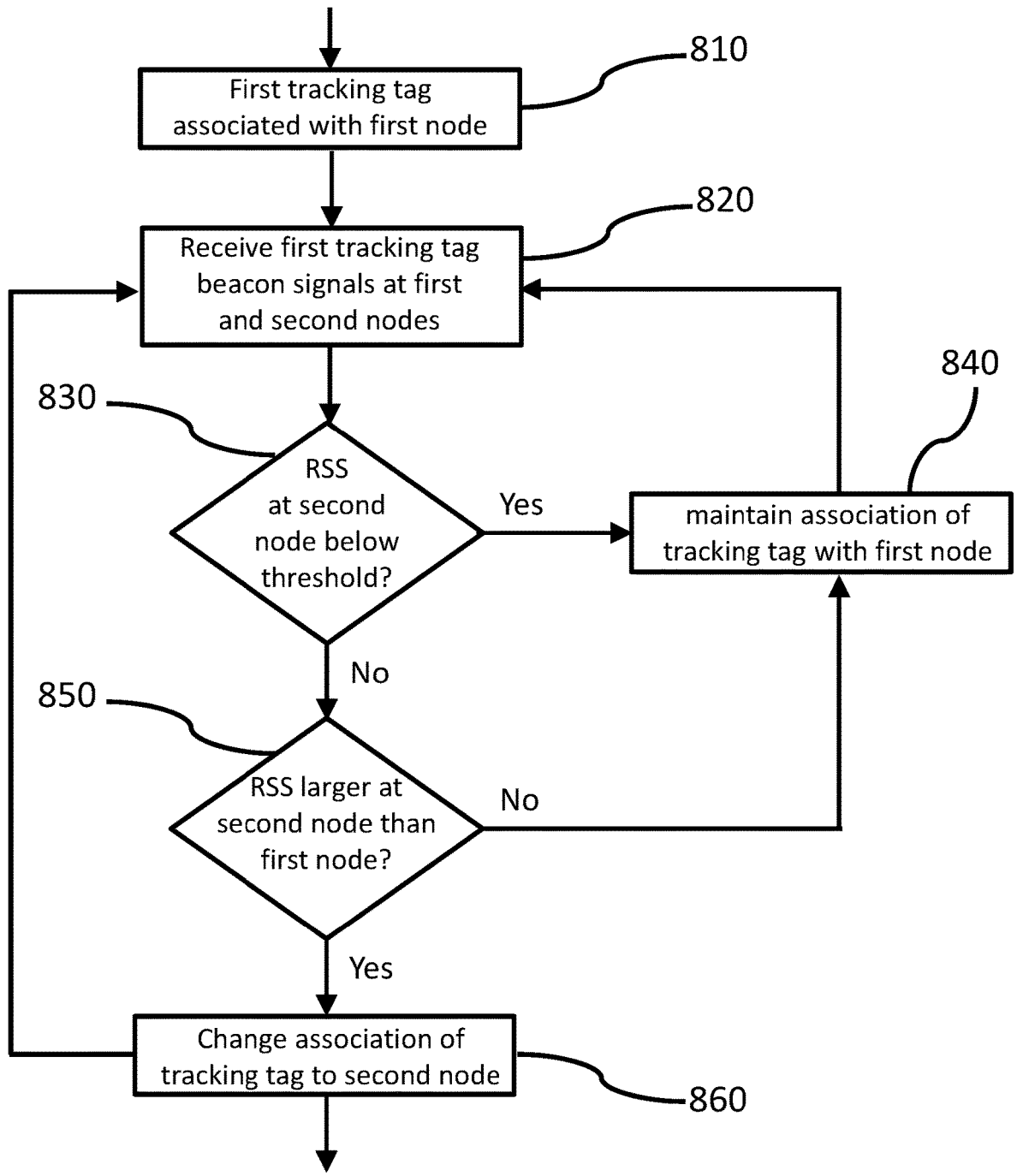
FIG. 8 illustrates a flow of an example process for ignoring transmissions having RSSI below a floor suitable for use with disclosed methods.

To save network bandwidth, it may be desirable to reduce the number of transmissions and or transmission payload. The number of transmissions of may be reduced if some amount of data is filtered out or ignored. FIG. 8 illustrates a flow of an example process for ignoring transmissions having RSSI below a floor which is suitable for use with disclosed methods.

Locating signals are not transmitted with the long-range radio frequency transmitters of the one or more of the plurality of wide-angle locating device nodes and the plurality of narrow-angle locating device nodes when the received signal strength is below a threshold value. At 810, a first tracking tag is associated with a first locating device node. The beacon signals of the first tracking tag are received at first and second nodes at 820. When it is determined, at 830, that the RSSI is below the threshold value, the association between the tracking tag and the first locating device node is maintained at 940 and RSSI received by the second locating device node is not forwarded on in one or more locating signals.

If it is determined the RSSI at the second locating device node is not below the threshold at 840, it is determined whether the RSSI received at the second locating device node is larger than the RSSI received by the first locating device node at 850. If it is determined that the RSSI at the second locating device node is not larger than the RSSI at the first locating device node, the association between the tracking tag and the first locating device node is maintained at 840. If it is determined that the RSSI at the second locating device node is larger than the RSSI at the first locating device node, the association between the tracking tag and the first locating device node is changed to an association with the second locating device node at 860.

The actions 810 to 860 are only illustrative and other alternatives can also be provided where one or more actions are added, one or more actions are removed, or one or more actions are provided in a different sequence without departing from the scope of the claims herein.

Figure 9:
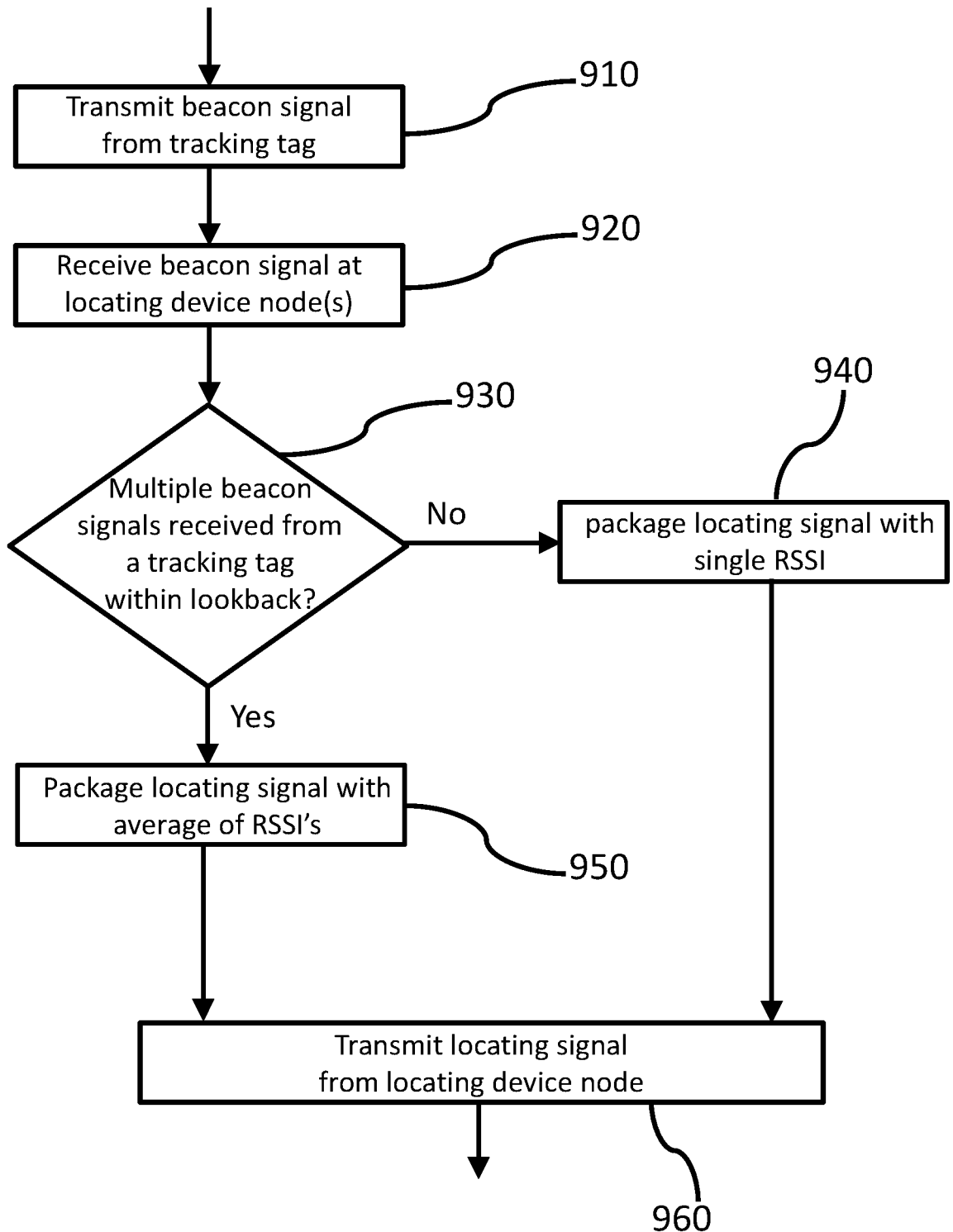
FIG. 9 illustrates a flow of an example process for filtering tracking tag transmissions suitable for use with disclosed methods.

According to another bandwidth-saving technique, the method may further include filtering tracking tag transmissions by combining a plurality of pings of a beacon signal. Referring to FIG. 9, a beacon signal is transmitted from a tracking tag at 910. The beacon signal is received at one or more locating device nodes at 920. At 930, it is determined whether multiple beacon signal pings are received from the tracking tag within a lookback period. If multiple pings of the beacon signal are received within the lookback period, the locating signal is prepared as a package including a combination of the multiple pings received and the unique identification information of the tracking tag at 950. Example techniques for combining multiple pings include but are not limited to averaging, weighted averaging, selective averaging and clustering.

If multiple pings are not received within the lookback period, the locating signal is prepared with a package including only the RSSI of the single ping at 940. The prepared locating signal may then be transmitted at 960. The lookback period may be any of a variety of durations which may be configurable. In an example, the lookback period is 5 seconds. The actions 910 to 960 are only illustrative and other alternatives can also be provided where one or more actions are added, one or more actions are removed, or one or more actions are provided in a different sequence without departing from the scope of the claims herein.

Figure 10:
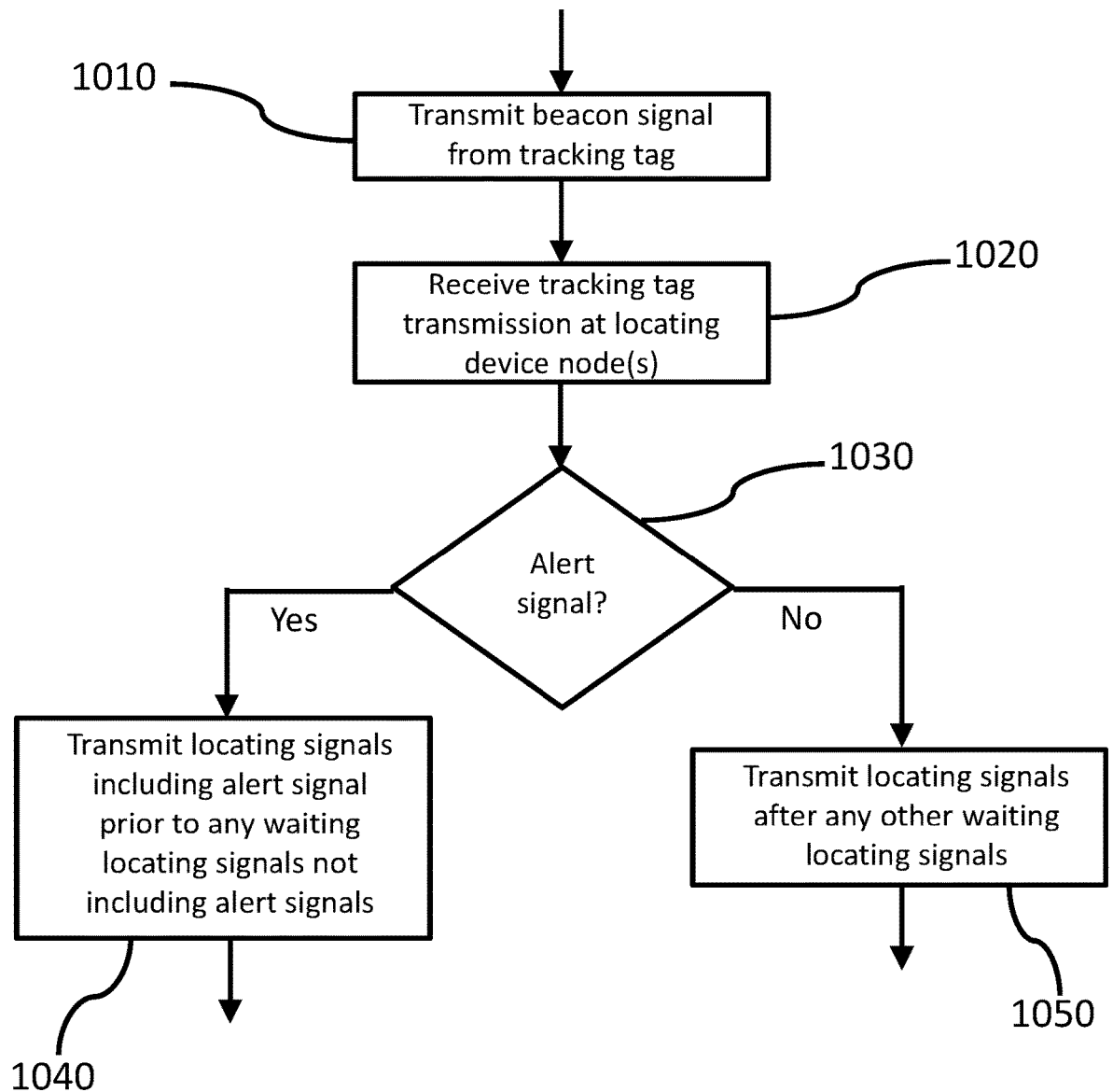
FIG. 10 illustrates a flow of an example process for prioritizing tracking tag alert signals suitable for use with disclosed methods.

Disclosed methods may include one or more alert routines responsive to sensed conditions of tracking tags. For example, an alert may be sent if a button of a tag is pressed, if a pull cord is disconnected, if a temperature is exceeded, if a temperature is not maintained, if the tag is being carried by a running person, if the tag has a horizontal orientation, if the tag experiences a high acceleration rate, if the tag experiences free fall. FIG. 10 illustrates a flow of an example process for prioritizing tracking tag alert signals which is suitable for use with disclosed methods. A beacon signal which is transmitted from a tracking tag at 1010 is received at one or more locating device nodes at 1020. At 1030, it is determined whether the beacon signal contains an alert. If the beacon contains an alert, at 1040, locating signals including the alert signal along with information from the tracking tag beacon are transmitted prior to any waiting locating signals lacking the alert signal. If the beacon signal does not contain an alert, at 1050, a locating signal including information from the tracking tag beacon signal is transmitted after other waiting locating signals, for example, according to a first-in, first-out protocol. The actions 1010 to 1050 are only illustrative and other alternatives can also be provided where one or more actions are added, one or more actions are removed, or one or more actions are provided in a different sequence without departing from the scope of the claims herein.

Figure 11:
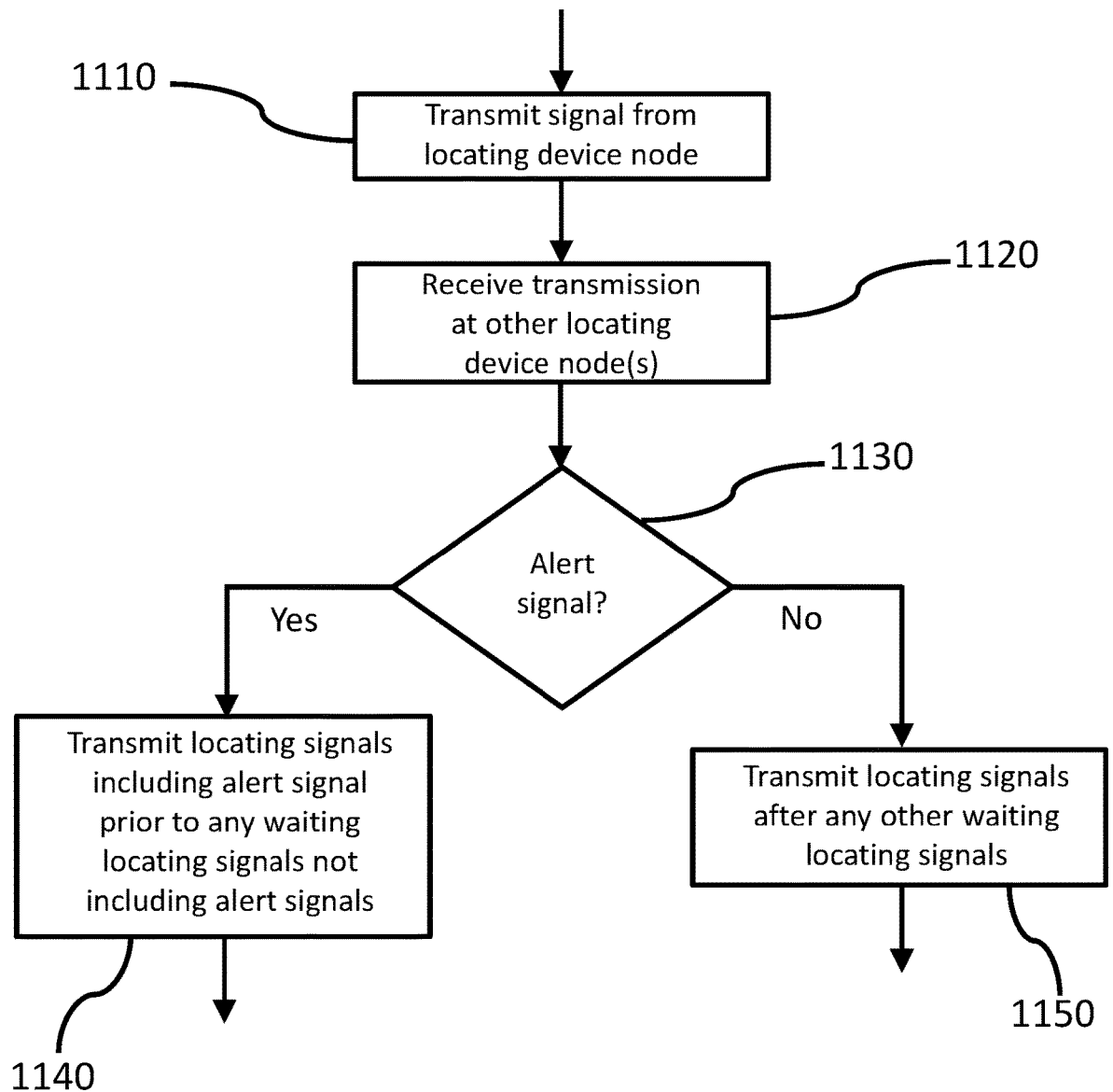
FIG. 11 illustrates a flow of an example process for prioritizing peer-to-peer locating device node transmitted alert signals which is suitable for use with disclosed methods.

Because the method may include transmission of locating signals between locating device nodes, locating device nodes may also need to prioritize between locating signals received from other locating device nodes. FIG. 11 illustrates a flow of an example process for prioritizing alert signals transmitted from locating device nodes suitable for use with disclosed methods. A locating signal which is transmitted from a locating device node at 1110 is received at one or more other locating device nodes at 1120. At 1130, it is determined whether the locating signal contains an alert. If the locating signal contains an alert, at 1140, locating signals including the alert signal along with information from tracking tag beacon signals are transmitted prior to any waiting locating signals lacking the alert signal. If the locating signal does not contain an alert, at 1150, a locating signal including information from tracking tag beacon signals is transmitted after other waiting locating signals. The actions 1110 to 1150 are only illustrative and other alternatives can also be provided where one or more actions are added, one or more actions are removed, or one or more actions are provided in a different sequence without departing from the scope of the claims herein.

Figure 12:
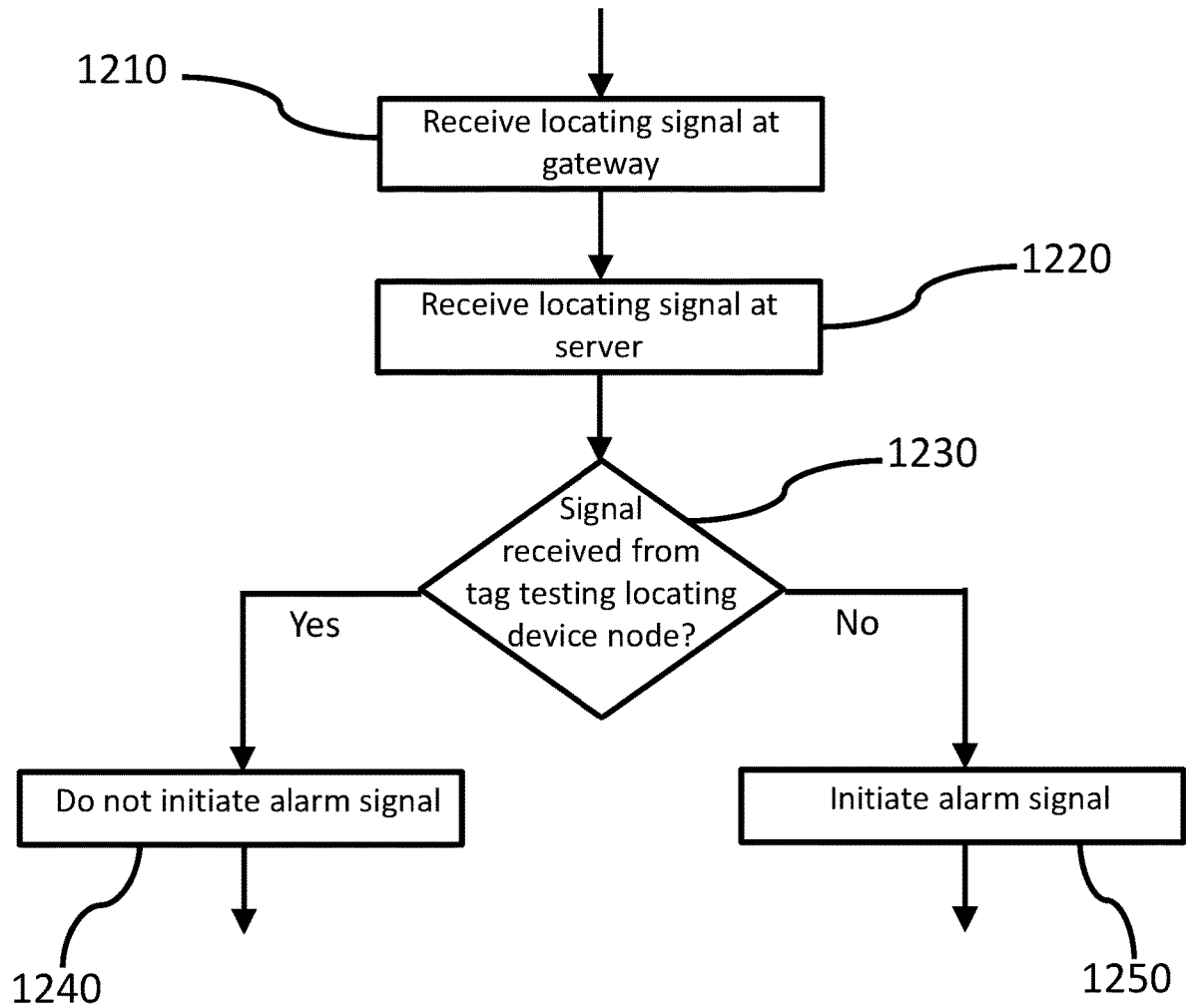
FIG. 12 illustrates a flow of an example process for selectively ignoring tracking tag alert signals.

Disclosed methods may include employing one or more tag-button-testing-stations to enable testing of many tag buttons simultaneously. FIG. 12 illustrates a flow of an example process for selectively disregarding tracking tag alert signals. At 1210, a locating signal is received at a gateway such as a wireless gateway. The locating signal is next received by a location server at 1220. At 1230, it is determined whether the signal was received from a tracking tag associated with a specialized tag testing locating device node. If the signal is received from a tracking tag associated with a tag testing locating device node, the alert portion of a beacon signal embedded in the locating signals is disregarded a pre-set period of time at 1240 and does not generate an alarm for the locating system. If the signal is received from a tracking device tag not associated with the tag testing locating device node, an alarm sequence is initiated at 1250. The actions 1210 to 1250 are only illustrative and other alternatives can also be provided where one or more actions are added, one or more actions are removed, or one or more actions are provided in a different sequence without departing from the scope of the claims herein.

The methods and processes described above and with reference to FIGS. 2-12 may be performed by any of a variety of systems and/or components. Generally, FIGS. 13-16 illustrate example systems and components suitable for performing disclosed methods and processes. Descriptions of the same follow.

Tracking Tags

Figure 13:
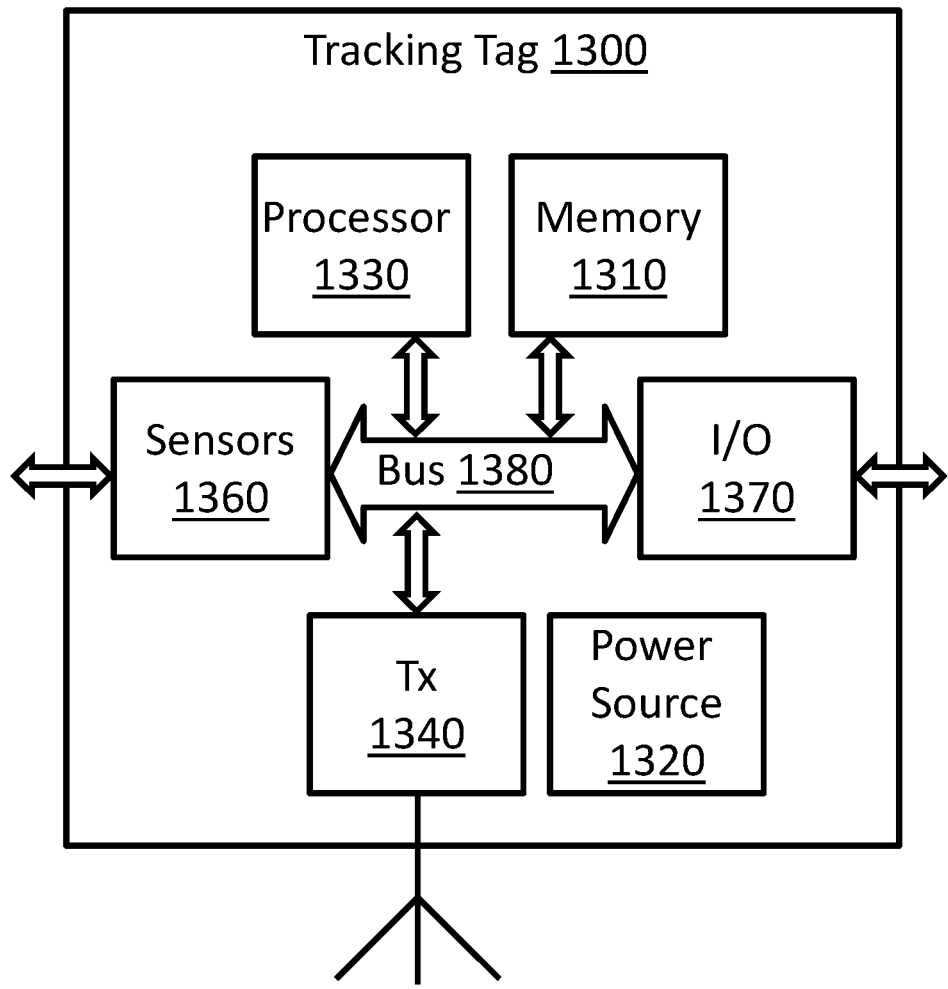
FIG. 13 schematically illustrates an example tracking tag suitable for use with disclosed systems.

FIG. 13 illustrates an example tacking tag 1300 for carrying by or on an asset to be tracked at a site. Each tracking tag 1300 includes a short-range radio frequency signal transmitter or transceiver 1340 configured to transmit a beacon signal with unique identification information of the tracking tag. Unique identification information may be, for example, a network address, a MAC address, a short address, a human-readable address or a name of the asset.

Unique identification information of each tracking tag may be associated with identification information of the asset, for example, in a database 150 in communication with server 140 (FIG. 1). In the case of a person, the identification information of the asset may be a name, a social security number, inmate number, patient number, resident number, etc.

Broadcast on a higher, short-range radio frequency, the beacon signal can, depending on structural materials, may penetrate internal physical structures of the site with a relatively low received signal strength. For particularly low received signal strength, the beacon signal may be effectively contained within the walls, ceiling and floor of a room. This makes it possible to disambiguate location of an asset when the asset is approximately equidistant from a receiver in the same room and from a receiver in an adjacent room which might otherwise receive the same signal strength from the short-range radio frequency signal transmitter. A power source 1320 such as one or more batteries or cells supplies power to signal transmitter 1340.

In an example, short-range radio frequency signal transmitter 1340 transmits beacon signals at 2.4 GHz as frequently as once every 0.5 seconds or as infrequently as once every 32 seconds. Short-range radio frequency signal transmitter 1340 need not be configured for receiving over the short-range band. The number of tracking tags in a site-specific system will vary with the number of assets to be tracked at a site.

Tracking tag 1300 may further include, but is not limited to, a memory 1310, computing hardware such as a processor or microprocessor 1330, Input/Output (I/O) devices 1370, a configuration of sensors 1360. A system bus 1380 may operatively couple various components including memory 1310, processor 1330, transmitter 1340, I/O devices 1370 and sensors 1360 or more than one of processor 1330, I/O devices 1370, transmitter 1340 and memory 1310 may be provided together on a single system-on-a-chip.

Memory 1310 may include non-removable memory. The non-removable memory, for example, includes Random-Access Memory (RAM) and/or flash memory.

Sensors 1360 may include one or more of a multimeter, an accelerometer, a magnetometer, a pressure sensor, a temperature sensor, a gyroscopic sensor, a Global Positioning System (GPS) sensor, or a timer.

A power source 1320 such as one or more batteries or cells supplies electrical power to components of tracking tag 1300 including processor 1330, I/O devices 1370, signal transmitter 1340 and sensors 1360.

I/O devices 1370 may include a plurality of LEDs. In an example, one LED indicates a state of power source 1320 and one LED indicates network connection status. One or more other LEDs may indicate one or more other states of the tracking tag 1300 or components thereof including but not limited to an alert state. I/O devices 1370 may further include one or more push buttons for various on-demand communications.

The short-range radio frequency signal transmitters may each be further configured to transmit an alert signal. Alert signals may be initiated by transmitter 1340 when, for example, a button is pressed, a cord or connector is pulled out/broken or when a person is down. Alert signals may be designated by data included in the beacon signal. For example, one or more digits or bits of the beacon signal may indicate the state of the alert such that a '0' may indicate no alert while a '1' indicates an alert. Further, one or more digits or bits may indicate alert type such as button pushed, person down, etc.

Locating Device Nodes

Figure 14:
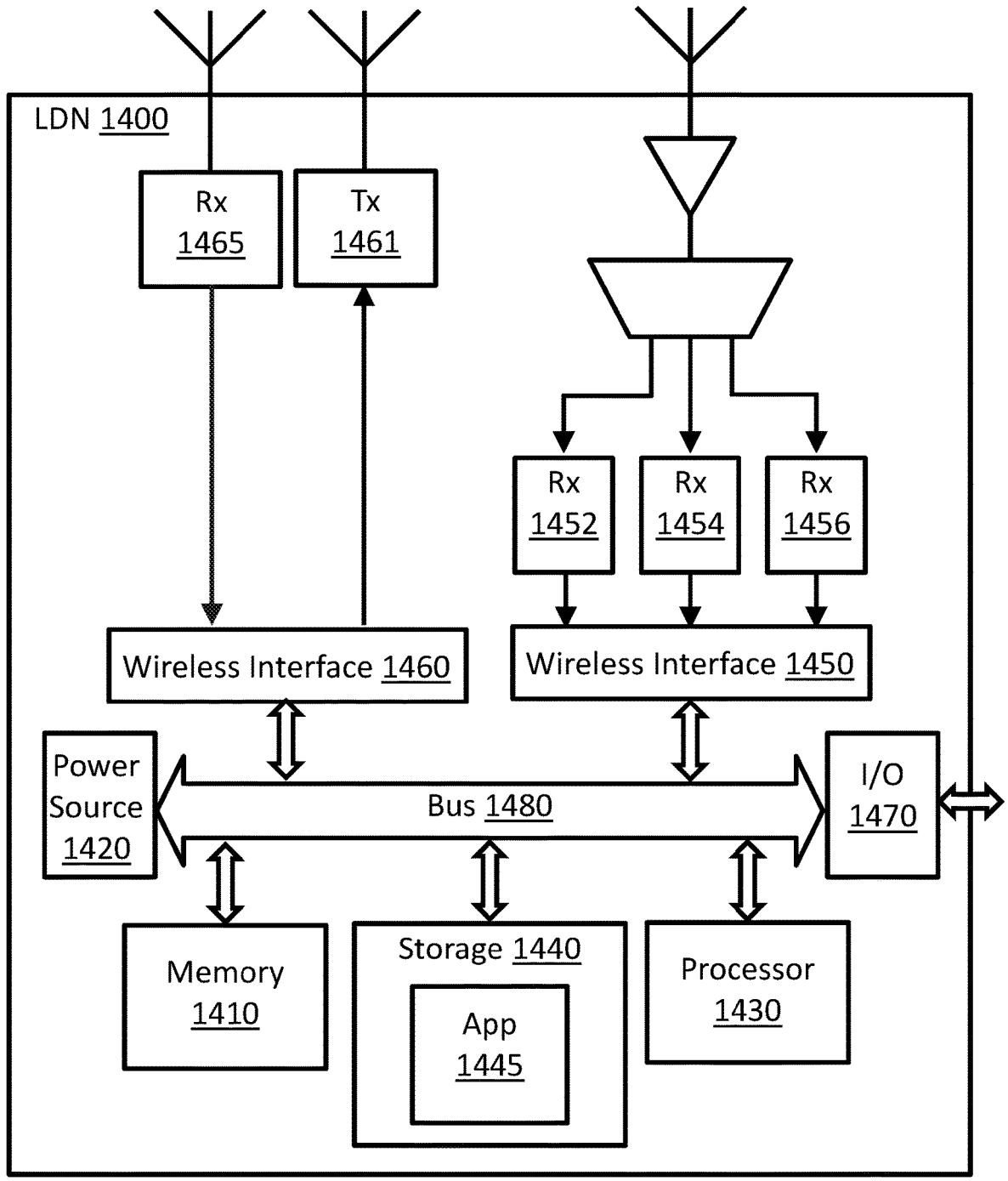
FIG. 14 schematically illustrates an example locating device node suitable for use with disclosed systems.

FIG. 14 schematically illustrates an example locating device node 1400 suitable for use with disclosed systems. Locating device node 1400 may be of a wide-angle variety or of a narrow-angle variety.

Each wide-angle locating device node 1400 includes a short-range radio frequency omnidirectional signal receiver 1452, 1454, 1456 and a long-range radio frequency transmitter 1461 and is assigned identification information such as network address, a MAC address, a short address, a human-readable address or a name of the locating device node location. The assigned identification information may be associated with a physical location of the wide-angle locating device node within the site, for example, in a database 150 in communication with server 140. Wide-angle locating device nodes 1400 are generally fixed in location and/or position on a structure of the site, for example, on a ceiling, wall or floor of a room or hallway. Omnidirectional signal receiver 1452, 1454, 1456 is configured to receive the beacon signals from any direction within a radius of receiver 1452, 1454, 1456. The beacon signals are received at a received signal strength which implies a proximity of the sending tracking tag to the wide-angle locating device node. In an example, the omnidirectional signal receiver includes three radios 1452, 1454, 1456 listening simultaneously on three channels around 2.4 GHz. Each of these radios may be any of a variety of known suitable radios. A CC2500 radio produced by Texas Instruments is an example of a radio model suitable for use in disclosed systems. In another example, a model of Bluetooth low-energy radio may be used. Wide-angle locating device nodes may be placed in larger, more wide-open spaces at the site to sense beacon signals from all directions. Wide-angle locating device nodes may be suitable for locating assets within rooms where assets may be anywhere, roughly, on a plane rather than at a point or along a line.

Each narrow-angle locating device node includes a directional signal receiver and a long-range radio frequency transmitter. The directional signal receiver is configured to receive, from a chosen or otherwise established direction, the beacon signals at a received signal strength. In an example, the directional signal receiver includes three directional radio antennas (analogous to 1452, 1454, 1456) listening simultaneously on three channels around 2.4 GHz. Suitable radios include those mentioned above with regard to the wide-angle locating device nodes. Narrow-angle locating device nodes may be placed in narrower spaces at the site to sense beacon signals from a desired direction. Narrow-angle locating devices may be suitable for locating assets at doorways or along hallways where assets are locatable, roughly, at a point or along a line.

Both varieties of locating device nodes include at least one long-range radio frequency transmitter 1461. Long-range radio frequency transmitter 1461 is configured to transmit a locating signal using a digital spread spectrum, long-range modulation over a wide area network. The unique identification information and a received signal strength indicator representing the received signal strength of beacon signals are packaged by the wide-angle locating device node and transmitted as part of the locating signal. Identification and/or location information of the locating device node are also included in the locating signal sent by long-range radio frequency transmitter 1461. In an example, long-range radio frequency transmitter 1461 transmits over a low-power, wide area network. In an example, the digital spread spectrum modulation is a LoRa protocol.

In an example, the long-range radio frequency transmitter uses a duplex 900 MHz band for transmission and for acknowledgements back from the gateway. Transmitted on a lower, long-range radio frequency, the locating signal can penetrate physical structures of the site, for example, the reinforced walls, floors and ceilings of a room or hallway with a higher signal strength than a 2.4 GHz band. This makes it possible to transmit the locating signal through architecturally dense structures to strategic and/or centralized locations distant from some of the locating device nodes, for example, to one or more other locating device nodes for forwarding or to the gateway/conduit.

Locating device node 1400 includes, but is not limited to, a memory 1410, a computing hardware such as a processor 1430, Input/Output (I/O) devices 1470, a storage 1440, a power source 1420 and a system bus 1480 that operatively couples various components including memory 1410, processor 1430, I/O devices 1470, wireless interface 1450, wireless interface 1460, and storage 1440.

Power source 1420 supplies electrical power to the various components of the locating device node. The power source may, for example, include one or more batteries or may be configured for wired supply of power from one or more circuits of the installation site.

Memory 1410 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

Storage 1440 is a computer-readable, non-transient data storage medium and/or memory. In an example, storage 1440 may store or otherwise contain records of tracking tag beacon signals, locating signals as well as raw and filtered data associated with both incoming and outgoing signals. Storage 1440 stores a locating application 1445 which may, for example, be part of a software product associated with a real-time location service for tracking assets at a site provided by real-time locating system 100. Executing the software product on processor 1430 results in, for example, managing incoming tracking tag beacon signals, outgoing locating signals as well as raw and filtered data associated with both incoming and outgoing signals. In a further example, executing the software of locating application 1445 may establish an association between a broadcasting transmitter tag and the locating device node in which locating application 1445 is installed.

The locating device nodes may each further include I/O devices 1470 in the form of configuration means to set a sensitivity of receivers 1452, 1454, 1456. It may be desirable that locating device nodes be tuned differently depending on potential distance from tracking tags. A site having different ceiling heights in different locations may necessitate increasing sensitivity of locating device nodes mounted on high ceilings and/or decreasing sensitivity of locating device nodes mounted on low ceilings or on walls. Sensitivity may be adjusted, for example, by rotating a knob or dial, translating a slider, moving a lever, depressing one or more buttons, an over-the-air setting update or a combination of these.

I/O devices 1470 may further include a plurality of LEDs. In example, one of the LEDs indicates a healthy state of the locating device node 1500 with a steady cadence of flashes, one of the LEDs illuminates when 900 MHz Rx is active, one of the LEDs illuminates when a beacon signal is active and one of the LEDs illuminates when there is a crash, reset or start-up. In an example, more than one of these LEDs may illuminate in a sequence to indicate normal start-up.

Wireless interface 1450 performs tasks necessary for translating between receivers 1452-1456 and processor 1430, translating instructions and data from processor 1430 to long-range radio frequency transmitter 1461 and for translating between receiver 1465 and processor 1430.

Locating application 1445, when executed on processor 1430, is optionally coupled to storage 1440, and is configured to substantially record and update received signal strength indicators, unique identification information and settings in storage 1440.

Additionally, locating application 1445, when executed on processor 1430, may store data related to received signal strength indicators, unique identification information and settings in storage 1440 as any of a variety of file types including but not limited to text or binary. Processor 1430 may provide system time as reference for including timestamps with stored data.

In an example, locating application 1445, when executed on processor 1430, is configured to not transmit or to prevent transmission of the locating signals when the received signal strength is below a floor. For example, the RSSI and the unique identification information of the tracking tag may be withheld from an outgoing locating signal if the RSSI is below a threshold value. This will reduce bandwidth use when many locating device nodes would otherwise all see a beacon signal from a given transmitter.

In some examples, locating application 1445, when executed on processor 1530, may be configured to include, in a locating signal of one of the plurality of locating device nodes, the unique identification information and an average of received signal strength indicators from each of a plurality of pings of the beacon signal when the plurality of pings are received by one of the plurality of locating device nodes within a set look-back period.

In some examples, locating application 1445, when executed on processor 1430, may be configured to, based upon the received signal strength, make an association between one or more of the tracking tags and one or more of the locating device nodes through the unique identification information of the tracking tag. For example, a tracking tag may be associated with the locating device node receiving a given beacon signal from the tracking tag at the highest received signal strength. The tag may be said to be located at or closest to this locating device node. As a tracking tag moves about a site, the locating device node receiving the highest strength signal will change.

Locating device nodes may be classified as primary, secondary or tertiary relative to one another. A tracking tag can pass from a starting locating device node to primary locating device nodes directly, cannot pass from a starting locating device node to a secondary locating device node without first passing a primary locating device node. Relative to the locating device node of interest, all other locating device nodes that are not designated as primary or secondary would be tertiary. Tertiary nodes are not involved in the algorithm assessing the requirement of intermediate associations.

In some examples, locating application 1445, when executed on processor 1530, may be configured to change from a first association between one of the tracking tags and a first of the locating device nodes to a next association between the one of the tracking tags and a second of the locating device nodes when a received signal strength of the beacon signals at the second of the locating device nodes is larger than a received signal strength indicator of beacon signals at the first of the locating device nodes. However, the first association may be maintained when movement of the one of the tracking tags along a physical path from the first of the locating device nodes to the second of the locating device nodes requires an intermediate association between the one of the tracking tags and an intermediate locating device node but no intermediate association has been made. As such, the association between tracking tag and the second of the locating device nodes suggested by the larger received signal strength indicator, interpreted as location, is ignored for violating physical constraints of the site and/or the locating device nodes.

In an alternative to ignoring location by maintaining or not changing association between tracking tags and locating device nodes, when movement of a tracking tag along a physical path from a first locating device node to a second locating device node requires an intermediate locating device node receive the highest received signal strength indicator of the beacon signal after the first locating device node receives the highest received signal strength indicator of the beacon signal and before the second locating device node receives the highest received signal strength indicator of the beacon signal, a highest received signal strength indicator at the second locating device node is excluded from the locating signals if the intermediate locating device node has not received the highest signal strength of the beacon signal as necessitated by the relative physical locations of the locating device nodes.

In some examples, locating application 1445, when executed on processor 1530, may be further configured to not maintain the association when the received signal strength is above a threshold. Ignoring location of the tracking tag is overridden or defeated with sufficiently high received signal strength being received at the second locating device.

Long-range radio frequency receiver 1465 is configured to receive, over the wide area network, settings updates from gateway 130 using the digital spread spectrum, long-range modulation and locating application 1445 is configured to apply the settings updates to one or more of the locating device nodes. In an example, settings updates are received by locating device nodes 1400 when the locating device nodes are listening for acknowledgement messages from gateway 130. Example updates the locating device nodes may receive and apply include but are not limited to network settings such as short address, 900 MHz band RSSI threshold, rejoin interval, 900 MHz band RSSI threshold, buffer window, check-in period, ping channels, ping period, pin transmit power, sensor select byte, man down delay, man down sensor debounce, compression enabled/disabled and RF settings such as public network true/false, frequency sub band, additional frequency sub bands, transmit power, transmit data rate, listen before talk sample time, listen before talk RSSI threshold, adaptive data rate true/false, adaptive lbt interval, adaptive lvt max RSSI, adaptive lbt offset, device class, transmit wait true/false, application port number, debug log level, network name and network passphrase.

The transmitters of the locating device nodes, upon receiving an alert signal may be further configured to, transmit, using the spread spectrum, long-range modulation over the wide area network, locating signals. Long-range radio frequency receiver 1465 is configured to receive, over the lower power wide area network, locating signals from other locating device nodes. This enables peer-to-peer communication among the locating device nodes so that locating signals may be forwarded from one locating device node to another before being received by gateway 130. This may be useful if an initiating locating device node is out of range of the gateway or for comparing RSSI between locating device nodes.

Locating signals responsive to alert signals from tracking tags include data designating the locating signals as containing an alert in addition to unique identification information of the tags. Locating signals containing an alert may be sent or forwarded from a locating device node at a priority level higher than a priority level of locating signals excluding the alert signal. For example, locating signals containing an alert are pushed to the head of the buffer in a memory or storage of the locating device node.

FIG. 14 is merely an example, which should not unduly limit the scope of the claims herein. It is to be understood that the specific designation for the locating device node 1400 is provided as an example and is not to be construed as limiting the locating device node to specific numbers, types, or arrangements of modules and/or components thereof. A person of ordinary skill in the art will recognize many variations, alternatives, and modifications of embodiments of the disclosure.

Gateway

Figure 15:
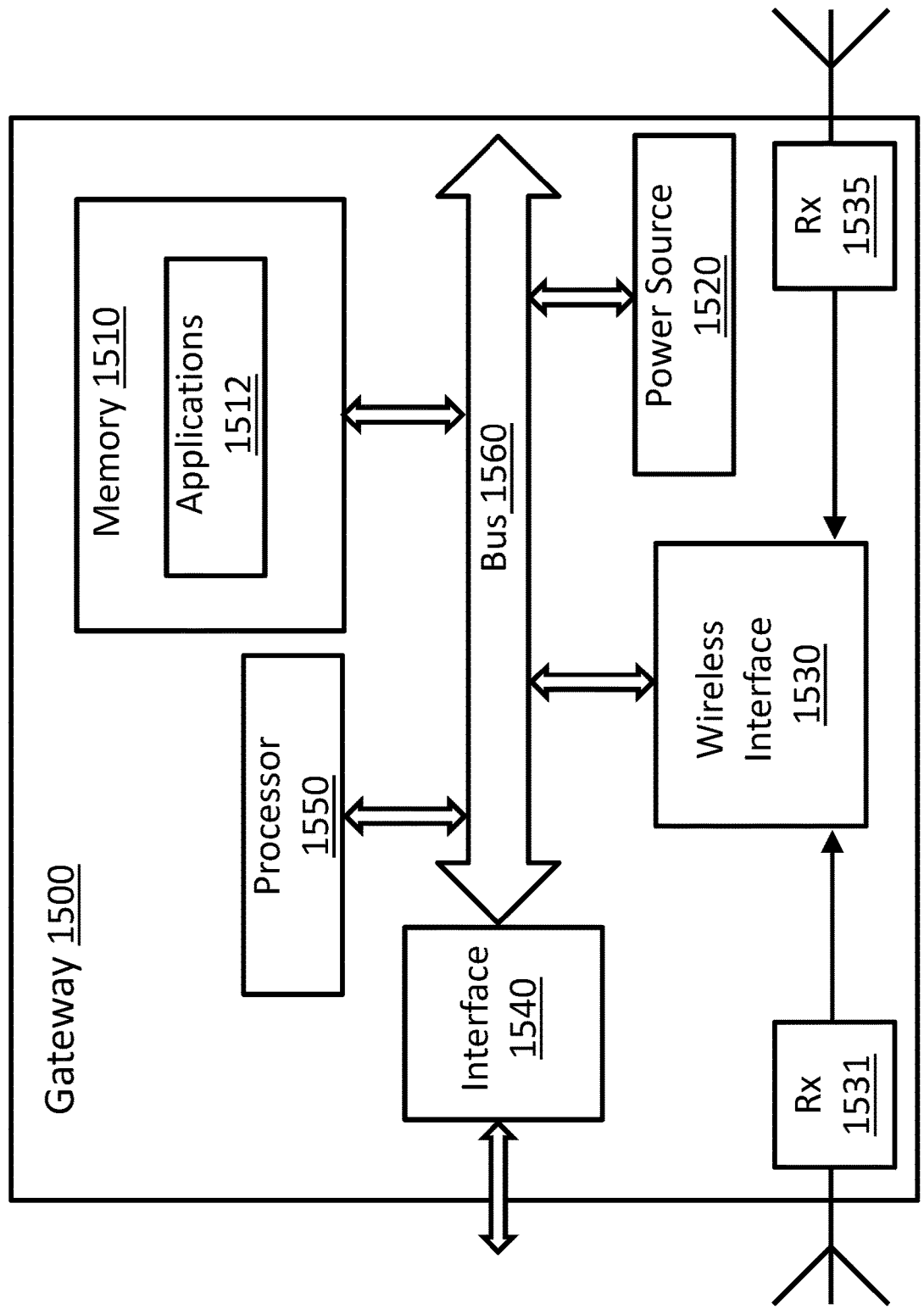
FIG. 15 schematically illustrates an example gateway suitable for use with disclosed systems.

FIG. 15 schematically illustrates an example gateway 1500 suitable for use with disclosed systems. Gateway 1500 includes, but is not limited to, a memory 1510, a computing hardware such as a processor 1550, a long-range wireless interface 1530, an interface 1540, a power source 1520 and a bus 1560 that operatively couples various components including memory 1510, processor 1550, interface 1540 and wireless interface 1630.

Power source 1520 supplies electrical power to the various components of gateway 1500. Power source 1520 may, for example, include one or more batteries, may be configured for wired supply of power from one or more circuits of the installation site or may be configured for power over ethernet.

Memory 1510 is a computer-readable, non-transient data storage medium and/or memory. Memory 1510 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

Memory 1510 stores applications 1512 which may, for example, be parts of a software product associated with a real-time location service for tracking assets at a site provided by real-time locating system 100. Executing the software product on processor 1550 results in managing incoming wireless signals such as locating signals from locating device nodes 1400 and forwarding received wireless signals to location server 140. Gateway 1500 is in wireless communication with the locating device nodes via the wide area network and includes receivers 1531 and 1535 configured to receive locating signals from the locating device nodes on the 900 MHz band.

Wireless interface 1530 performs tasks necessary for translating between receiver 1531 and 1535 and processor 1550 and tasks necessary for translating instructions and data from processor 1530 to interface 1540 and for forwarding to location server 140. In an example, components of applications 1512, by execution on processor 1550, control operations of wireless interface 1530. Interface 1540 is configured to forward communications to a server such as location server 140 (FIG. 1).

FIG. 15 is merely an example, which should not unduly limit the scope of the claims herein. It is to be understood that the specific designation for gateway 1500 is provided as an example and is not to be construed as limiting gateway 1500 to specific numbers, types, or arrangements of modules and/or components thereof. A person of ordinary skill in the art will recognize many variations, alternatives, and modifications of embodiments of the disclosure.

Location Server

Figure 16:
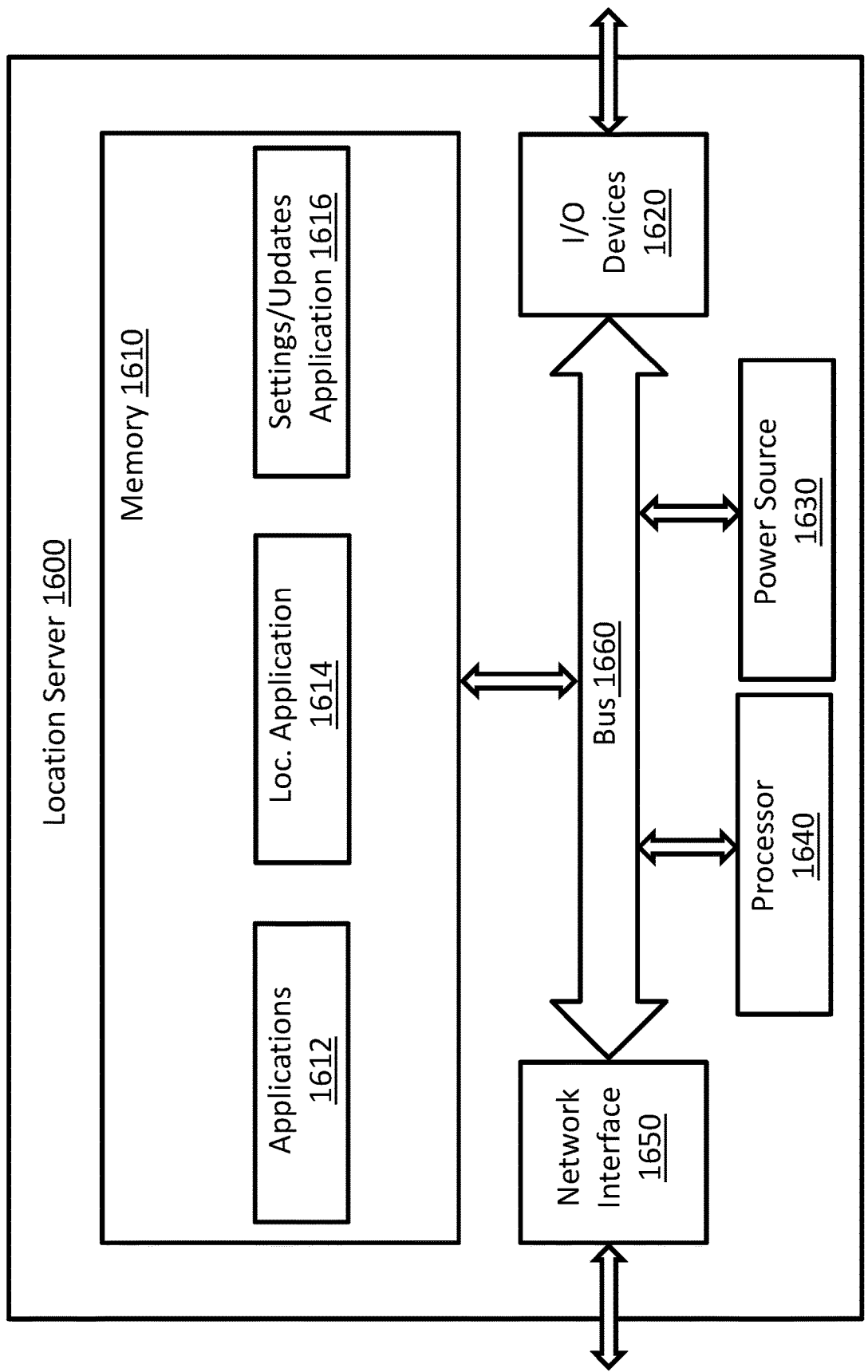
FIG. 16 schematically illustrates an example location server suitable for use with disclosed systems.

FIG. 16 schematically illustrates an example location server 1600 suitable for use with disclosed systems. Location server 1600, which may be an implementation of server 140 of FIG. 1, is optionally implemented by way of at least one of: a laptop computer, a desktop computer, an NAS device, and a large-sized touch screen with an embedded PC.

Location server 1600 includes, but is not limited to, a memory 1610, a computing hardware such as a processor 1640, Input/Output (I/O) devices 1620, a network interface 1650, a power source 1630 and a system bus 1660 that operatively couples various components including memory 1610, processor 1640, I/O devices 1620, network interface 1650, and power source 1630. I/O devices 1620 may include a display screen for presenting graphical images to a user of server 1600.

Power source 1630 supplies electrical power to the various components of server 1600. Power source 1630 may, for example, be configured for wired supply of power from one or more circuits of the installation site or a remote site.

Memory 1610 is a computer-readable, non-transient data storage medium. Memory 1610 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

Memory 1610 stores applications 1612, location application 1614 and settings/updates application 1616 which may, for example, be parts of a software product associated with a real-time location service for tracking assets at a site provided by real-time locating system 100. Executing location application 1614 may result in generating and rendering a graphical user interface on the display screen. The graphical user interface is configured to facilitate user interactions with services for locating assets at a site. Memory 1610 may further store an operating system for facilitating execution of various software products on processor 1640. Example operating systems include but are not limited to Windows™, OS X™, Linux™ and Chrome™.

In some examples, the display screen may be a touch-sensitive display screen that is operable to receive tactile inputs from the user. These tactile inputs may, for example, include clicking, tapping, pointing, moving, pressing and/or swiping with a finger or a touch-sensitive object like a pen. Additionally or alternatively, I/O devices 1620 include a mouse or a joystick that is operable to receive inputs corresponding to clicking, pointing, and/or moving a pointer object on the graphical user interface. I/O devices 1620 may also include a keyboard that is operable to receive inputs corresponding to pushing certain buttons on the keyboard.

In an example, memory 1610 may store or otherwise contain records of tracking tag beacon signals, locating signals as well as raw and filtered data associated with both incoming and outgoing signals.

The software product, when executed on processor 1640, is optionally coupled to memory 1610, and is configured to record and update records of tracking tag beacon signals, locating signals as well as raw and filtered data associated with both incoming and outgoing signals.

In another example, when executed on processor 1640, the software product is configured to, in location database 150, record and update records of tracking tag beacon signals, locating signals as well as raw and filtered data associated with both incoming and outgoing signals.

Additionally, location application 1614, when executed on processor 1640, may store data related to records of tracking tag beacon signals, locating signals as well as raw and filtered data associated with both incoming and outgoing signals in memory 1610 as any of a variety of file types including but not limited to text or binary. Processor 1640 may provide system time as reference for including timestamps with stored data.

Furthermore, network interface 1650 allows location server 1600 to receive records of tracking tag beacon signals, locating signals as well as raw and filtered data associated with both incoming and outgoing signals from gateway 140, for example, and may similarly allow location server 1600 to receive records from location database 150. Additionally, network interface 1650 may allow server 1600 to access one or more other networks to update the software product and/or download one or more new software products associated with the real-time location service for tracking assets at a site.

In implementations of system 100 for which less intelligence is distributed to the edge, for which responsibilities for operating system 100 are shared between locating device nodes 1400 and server 1600 or for which duplication of locating device node actions by server 1600 is desirable, server 1600 may perform one or more of the actions disclosed above as being performed by the locating device nodes. For example, when location application 1614 in combination with applications 1612 and/or settings and updates application 1616 is executed on processor 1640, it is configured to, based upon the received signal strength, make an association between one or more of the tracking tags and one or more of the locating device nodes through the unique identification information.

In a further example, when executed on processor 640, location application 1614 in combination with applications 1612 and/or settings and updates application 1616 may be further configured to change from a first association between one of the tracking tags and a first of the locating device nodes to a next association between the one of the tracking tags and a second of the locating device nodes when a received signal strength at the second of the locating device nodes is larger than a received signal strength at the first of the locating device nodes. However, location application 1614 in combination with applications 1612 and/or settings and updates application 1616 may be configured to preserve the first association when movement of the one of the tracking tags along a physical path from the first of the locating device nodes to the second of the locating device nodes requires an intermediate association between the one of the tracking tags and an intermediate locating device node but no intermediate association has been made. As such, the association between tracking tag and the second of the locating device nodes suggested by the larger received signal strength, interpreted as location, is ignored.

In yet another example, when executed on processor 1640, location application 1614 in combination with applications 1612 and/or settings and updates application 1616 may be further configured to not preserve the association when the received signal strength is above a threshold. Ignoring location of the tracking tag is overridden with sufficiently high received signal strength, or significantly long in time, being received at the second locating device.

FIG. 16 is merely an example, which should not unduly limit the scope of the claims herein. It is to be understood that the specific designation for location server 1600 is provided as an example and is not to be construed as limiting location server 1600 to specific numbers, types, or arrangements of modules and/or components of location server 1600. A person of ordinary skill in the art will recognize many variations, alternatives, and modifications of embodiments of the disclosure.

Tag Testing Nodes

The system may further include a tag testing node including at least one of the locating device nodes, an output and a processing application configured to output unique identification information of one of the one or more assets when one of the beacon signals is received by the at least one of the locating device nodes of the tag testing node. Alternatively, unique identification information of one or more tracking tags associated with the one or more assets may be output. By outputting the system may, for example, by present an asset name or a tracking tag short name to a large display visible by many users. Upon outputting the unique identification information, the system may be configured to start a countdown. During the countdown a user can test alert functions of a tracking tag without generating a nuisance alarm. The alert portion of a beacon signal embedded in the locating signals is disregarded 1614 upon receipt of the alert signal by server 1600.

Output from the tag testing node may include but is not limited to visual output through a display, audio output through a speaker, palpable vibrations and combinations of these. In an example, when a user carrying a tracking tag sees unique identification information associated with their tracking tag on the display or hears the unique identification information through the speaker, they will know they can test their tag during the countdown without causing initiation of a live alarm. For example, the user can push an alarm button within 10 seconds of observing the unique identification information to send a test alert and/or alarm. The tag testing node and/or its processing application may output an indication of the result of the test alarm to the user so that the user can take appropriate action such as having the tracking tag repaired or replaced.

Embodiments of the disclosure are susceptible to being used for various purposes, including, though not limited to, enabling users to track assets at a site.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim disclosed features are intended to be construed in a non-exclusive manner, namely allowing for items, components or elements not explicitly described also to be present. Reference to the singular is also to be construed to relate to the plural.

What is claimed is:

1. A real-time location method for tracking assets at a site, comprising:
   with a short-range radio frequency signal transmitter of at least one tracking tag for carrying by or on the assets, transmitting a beacon signal with unique identification information of the at least one tracking tag;
   with one or more signal receivers of one or more wide-angle locating device nodes each including at least one omnidirectional signal receiver and one or more narrow-angle locating device nodes each including at least one directional signal receiver, receiving the beacon signal at a received signal strength;
   with at least one of a long-range radio frequency transmitter of the one or more wide-angle locating device nodes and a long-range radio frequency transmitter of the one or more narrow-angle locating device nodes, transmitting a locating signal including the unique identification information of the at least one tracking tag and a received signal strength indicator representing the received signal strength using a chirp spread spectrum modulation over a wide area network; and
   with a receiver of a gateway in wireless communication with the wide-angle and narrow-angle locating device nodes, receiving locating signals from the wide-angle and/or narrow-angle locating device nodes over the wide area network; and
   based upon the received signal strength indicator, in a database, associating the one of the at least one tracking tags to one or more of the wide-angle and narrow-angle locating device nodes through the unique identification information to locate the at least one tracking tag at one of the one or more of the wide-angle and narrow-angle locating device nodes.

2. The method as set forth in claim 1, further comprising:
   changing from a first association between the at least one tracking tag and a first of the locating device nodes to a next association between the at least one tracking tag and a second of the locating device nodes when a received signal strength indicator of the beacon signal of the at least one tracking tag at the second of the locating device nodes is larger than a received signal strength indicator of the beacon signal of the at least one tracking tag at the first of the locating device nodes; and
   maintaining the first association when movement of the at least one tracking tag along a physical path through the site from the first of the locating device nodes to the second of the locating device nodes requires an intermediate association between the at least one tracking tag and an intermediate locating device node after the first association and before the next association but no intermediate association has been made.

3. The method as set forth in claim 2, further comprising not maintaining the association when the received signal strength indicator of the beacon signal is above a threshold.

4. The method as set forth in claim 1, further comprising:
   with a long-range radio frequency receiver of one or more of the plurality of locating device nodes, receiving settings updates from the gateway over the lower power wide area network; and
   with a processing application of the one or more of the plurality of locating device nodes, applying the settings updates to one or more of the plurality of locating device nodes.

5. The method as set forth in claim 1, further comprising, with a long-range radio frequency receiver of one or more of the plurality of locating device nodes, receiving locating signals from other locating device nodes over the lower power wide area network.

6. The method as set forth in claim 1, further comprising adjusting a sensitivity of one or more of the receivers with a configuration means.

7. The method as set forth in claim 1, further comprising not transmitting locating signals including the unique identification information of the at least one tracking tag with the long-range radio frequency transmitters of the one or more of the plurality of wide-angle locating device nodes when the received signal strength indicator of the beacon signals is below a threshold value.

8. The method as set forth in claim 1, further comprising, with at least one of the long-range radio frequency transmitter of the one or more wide-angle locating device nodes or the long-range radio frequency transmitter of the one or more narrow-angle locating device nodes, transmitting a locating signal including the unique identification information and a combination of received signal strength indicators from each of a plurality of pings of the beacon signal when, within a set look-back period, the plurality of pings of the beacon signal are received by at least one of the omnidirectional signal receivers and the directional signal receivers.

9. The method as set forth in claim 1, further comprising:
 transmitting an alert signal with a short-range radio frequency signal transmitter of the at least one tracking tag; and
 with the transmitters of the at least one of the locating device nodes using the spread spectrum, long-range modulation over the wide area network, transmitting locating signals including an alert signal at a priority level higher than a priority level of locating signals without an alert signal.

10. The method as set forth in claim 1, further comprising selectively confining alert signals for a given tracking tag for a pre-set period upon association between the given tracking tag and a locating device node configured as a tag testing locating device node.

11. A real-time location system for tracking assets at a site, the system comprising:
 one or more tracking tags for carrying by or on the assets, each including a short-range radio frequency signal transmitter configured to transmit a beacon signal with unique identification information of the tracking tag;
 one or more wide-angle locating device nodes each including:
  an omnidirectional signal receiver configured to receive, from within a radius of the omnidirectional signal receiver, the beacon signals at a received signal strength; and
  a long-range radio frequency transmitter configured to transmit, using a chirp spread spectrum modulation over a wide area network, locating signals including the unique identification information of the tracking tag and a received signal strength indicator representing the received signal strength of the beacon signals;
 one or more narrow-angle locating device nodes each including:
  a directional signal receiver configured to receive, from a chosen direction, the beacon signals at a received signal strength; and
  a long-range radio frequency transmitter configured to transmit, using the chirp spread spectrum over the wide area network, locating signals including the unique identification information of the tracking tag and a received signal strength indicator representing the received signal strength of the beacon signals; and
 a processing application configured to, based upon the received signal strength indicator of beacon signals, make an association, in a database, between one or more of the tracking tags and one or more of the wide-angle and narrow-angle locating device nodes through the unique identification information of the tracking tags to locate the at least one tracking tag at one of the one or more of the wide-angle and narrow-angle locating device nodes.

12. The system as set forth in claim 11, wherein the processing application is further configured to:
 change from a first association between one of the tracking tags and a first of the locating device nodes to a next association between the one of the tracking tags and a second of the locating device nodes when a received signal strength indicator of the beacon signals at the second of the locating device nodes is larger than a received signal strength indicator of the beacon signals at the first of the locating device nodes; and
 maintain the first association when movement of the one of the tracking tags along a physical path through the site from the first of the locating device nodes to the second of the locating device nodes requires an intermediate association between the one of the tracking tags and an intermediate locating device node after the first association and before the next association but no intermediate association has been made.

13. The system as set forth in claim 12, wherein the processing application is further configured to not maintain the association when the received signal strength indicator of the beacon signals is above a threshold of signal strength or a threshold of persistence in time.

14. The system as set forth in claim 11, wherein the locating device nodes each further include:
 a long-range radio frequency receiver configured to receive, over the wide area network, settings updates from a gateway in wireless communication with the wide-angle and narrow-angle locating device nodes; and
 a processing application configured to apply the settings updates to one or more of the locating device nodes.

15. The system as set forth in claim 11, wherein the locating device nodes each further include a long-range radio frequency receiver configured to receive, over the lower power wide area network, locating signals from other locating device nodes.

16. The system as set forth in claim 11, wherein the locating device nodes each include configuration means to set a sensitivity of the receivers.

17. The system as set forth in claim 11, wherein the locating device nodes are configured to not transmit, locating signals including the unique identification information of the at least one tracking tag with the long-range radio frequency transmitters when the received signal strength indicator of the beacon signals is below a threshold value.

18. The system as set forth in claim 11, wherein a locating signal of one of the one or more locating device nodes includes the unique identification information and an average of received signal strength indicators from each of a plurality of pings of the beacon signal when the plurality of pings are received by one of the plurality of locating device nodes within a set look-back period.

19. The system as set forth in claim 11, wherein the tracking tags, using the short-range radio frequency signal transmitters, are further configured to transmit an alert signal; and
 wherein the long-range radio frequency transmitters of the locating device nodes are configured to:
  transmit, using the spread spectrum, long-range modulation over the wide area network, locating signals including the alert signal, unique identification information of the tracking tag and a received signal strength indicator representing the received signal strength of the alert signal; and prioritize transmission of locating signals with an alert signal over locating signals without an alert signal.

20. The system as set forth in claim 11, wherein the tracking tags, using the short-range radio frequency signal transmitters, are further configured to transmit an alert signal; and
    at least one of the locating device nodes is configured as a tag testing locating device node; and
    a gateway in wireless communication with the wide-angle and narrow-angle locating device nodes is configured to confine, for a pre-set period of time, alert signals from for a given tracking tag upon association between the given tracking tag and the tag testing locating device node.

21. A real-time location method for tracking assets at a site, comprising:
    with a short-range radio frequency signal transmitter of at least one tracking tag for carrying by or on the assets, transmitting a beacon signal with unique identification information of the at least one tracking tag;
    with one or more signal receivers of one or more wide-angle locating device nodes each including at least one omnidirectional signal receiver and one or more narrow-angle locating device nodes each including at least one directional signal receiver, receiving the beacon signal at a received signal strength;
    with at least one of a long-range radio frequency transmitter of the one or more wide-angle locating device nodes and a long-range radio frequency transmitter of the one or more narrow-angle locating device nodes, transmitting a locating signal including the unique identification information of the at least one tracking tag and a received signal strength indicator representing the received signal strength using a LoRa protocol over a wide area network; and
    with a receiver of a gateway in wireless communication with the wide-angle and narrow-angle locating device nodes, receiving locating signals from the wide-angle and/or narrow-angle locating device nodes over the wide area network; and
    based upon the received signal strength indicator, in a database, associating the one of the at least one tracking tags to one or more of the wide-angle and narrow-angle locating device nodes through the unique identification information to locate the at least one tracking tag at one of the one or more of the wide-angle and narrow-angle locating device nodes.

22. A real-time location system for tracking assets at a site, the system comprising:
    one or more tracking tags for carrying by or on the assets, each including a short-range radio frequency signal transmitter configured to transmit a beacon signal with unique identification information of the tracking tag;
    one or more wide-angle locating device nodes each including:
        an omnidirectional signal receiver configured to receive, from within a radius of the omnidirectional signal receiver, the beacon signals at a received signal strength; and
        a long-range radio frequency transmitter configured to transmit, using a LoRa protocol over a wide area network, locating signals including the unique identification information of the tracking tag and a received signal strength indicator representing the received signal strength of the beacon signals;
    one or more narrow-angle locating device nodes each including:
        a directional signal receiver configured to receive, from a chosen direction, the beacon signals at a received signal strength; and
        a long-range radio frequency transmitter configured to transmit, using the LoRa protocol over the wide area network, locating signals including the unique identification information of the tracking tag and a received signal strength indicator representing the received signal strength of the beacon signals; and
    a processing application configured to, based upon the received signal strength indicator of beacon signals, make an association, in a database, between one or more of the tracking tags and one or more of the wide-angle and narrow-angle locating device nodes through the unique identification information of the tracking tags to locate the at least one tracking tag at one of the one or more of the wide-angle and narrow-angle locating device nodes.

\* \* \* \* \*